(12) United States Patent
Hsieh et al.

(10) Patent No.: US 10,048,466 B2
(45) Date of Patent: Aug. 14, 2018

(54) PHOTOGRAPHING OPTICAL LENS ASSEMBLY, IMAGE CAPTURING UNIT AND ELECTRONIC DEVICE

(71) Applicant: LARGAN Precision Co.,Ltd., Taichung (TW)

(72) Inventors: Tung-Yi Hsieh, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/991,485

(22) Filed: Jan. 8, 2016

(65) Prior Publication Data

US 2017/0153416 A1    Jun. 1, 2017

(30) Foreign Application Priority Data

Nov. 27, 2015 (TW) .............................. 104139710 A

(51) Int. Cl.
*G02B 13/18* (2006.01)
*G02B 3/02* (2006.01)
*G02B 13/00* (2006.01)
*G02B 13/06* (2006.01)

(52) U.S. Cl.
CPC ....... *G02B 13/0045* (2013.01); *G02B 13/005* (2013.01); *G02B 13/06* (2013.01)

(58) Field of Classification Search
CPC .... G02B 9/62; G02B 13/005; G02B 13/0045; G02B 27/0025; H04N 5/2253; H04N 5/2254
USPC ........................................................ 359/713
See application file for complete search history.

(56) References Cited

U.S. PATENT DOCUMENTS

| 8,456,763 B2 | 6/2013 | Hsieh et al. |
| 2012/0105981 A1 | 5/2012 | Peng et al. |
| 2015/0286037 A1 | 10/2015 | Ono |
| 2017/0031135 A1 | 2/2017 | Tang et al. |
| 2017/0031136 A1 | 2/2017 | Tang et al. |
| 2017/0059819 A1 | 3/2017 | Liu et al. |
| 2017/0059820 A1 | 3/2017 | Tang et al. |
| 2017/0059821 A1 | 3/2017 | Liu et al. |
| 2017/0059822 A1 | 3/2017 | Tang et al. |
| 2017/0068070 A1 | 3/2017 | Tang et al. |
| 2017/0068071 A1 | 3/2017 | Tang et al. |

FOREIGN PATENT DOCUMENTS

| CN | 204462511 U | 7/2015 |
| CN | 204807792 U | 11/2015 |
| JP | 08-234100 | 9/1996 |
| JP | 10-111454 | 4/1998 |

(Continued)

*Primary Examiner* — Alicia M Harrington
(74) *Attorney, Agent, or Firm* — Muncy, Geissler, Olds & Lowe, P.C.

(57) ABSTRACT

A photographing optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The fourth lens element has positive refractive power. The fifth lens element has positive refractive power. The sixth lens element has negative refractive power. The photographing optical lens assembly has a total of six lens elements, and the photographing optical lens assembly further includes an aperture stop.

33 Claims, 23 Drawing Sheets

(56) References Cited

FOREIGN PATENT DOCUMENTS

| JP | 2008-233610 | 10/2008 |
|----|-------------|---------|
| JP | 2012-098724 | 5/2012 |
| JP | 2014-85559 | 5/2014 |
| WO | WO2014/087602 | 6/2014 |

PHOTOGRAPHING OPTICAL LENS ASSEMBLY, IMAGE CAPTURING UNIT AND ELECTRONIC DEVICE

RELATED APPLICATIONS

This application claims priority to Taiwan Application 104139710, filed Nov. 27, 2015, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or CMOS (Complementary Metal-Oxide-Semiconductor) sensor. As the advanced semiconductor manufacturing technologies have reduced the pixel size of sensors, and compact optical systems have gradually evolved toward the field of higher megapixels, there is an increasing demand for compact optical systems featuring better image quality.

The compact optical systems have been widely applied to different kinds of electronic devices, such as household appliances, driving recorders, wearable devices, aerial photographic cameras and video game consoles. In recent years, one or more optical systems have been equipped on a single electronic device so that the electronic device is applicable to many applications having different requirements of the imaging characteristics. However, the conventional compact optical system is unable to satisfy the requirements of wide field of view and high image quality simultaneously and inapplicable to the electronic devices with high-end specifications.

SUMMARY

According to one aspect of the present disclosure, a photographing optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The fourth lens element has positive refractive power. The fifth lens element has positive refractive power. The sixth lens element has negative refractive power. The photographing optical lens assembly has a total of six lens elements, and the photographing optical lens assembly further includes an aperture stop. When a focal length of the first lens element is f1, a focal length of the second lens element is f2, a focal length of the third lens element is f3, a central thickness of the third lens element is CT3, a central thickness of the sixth lens element is CT6, a curvature radius of a surface closest to the aperture stop among all surfaces of at least one of the lens elements of the photographing optical lens assembly located between the imaged object and the aperture stop is Rsf, a focal length of the photographing optical lens assembly is f, the following conditions are satisfied:

$|f1|<|f2|<|f3|$;

$0<CT6/CT3<0.80$; and $-1.5<Rsf/f$.

According to another aspect of the present disclosure, an image capturing unit includes the aforementioned photographing optical lens assembly and an image sensor, wherein the image sensor is disposed on an image surface of the photographing optical lens assembly.

According to still another aspect of the present disclosure, an electronic device includes the aforementioned image capturing unit.

According to yet still another aspect of the present disclosure, a photographing optical lens assembly includes, in order from an object side to an image side, a first lens element, a second lens element, a third lens element, a fourth lens element, a fifth lens element and a sixth lens element. The first lens element has negative refractive power. The second lens element has negative refractive power. The fourth lens element has positive refractive power. The fifth lens element has positive refractive power. The sixth lens element has negative refractive power. The photographing optical lens assembly has a total of six lens elements, and the photographing optical lens assembly further includes an aperture stop. There are a front lens group comprising every lens element located between an imaged object and the aperture stop in the photographing optical lens assembly, and a rear lens group comprising every lens element located between the aperture stop and an image surface in the photographing optical lens assembly. When a focal length of the first lens element is f1, a focal length of the second lens element is f2, a focal length of the third lens element is f3, a central thickness of the third lens element is CT3, a minimum central thickness among central thicknesses of all lens elements of the photographing optical lens assembly is CTmin, a focal length of the front lens group is ff, a focal length of the rear lens group is fr, the following conditions are satisfied:

$|f1|<|f2|<|f3|$;

$4.0<CT3/CTmin<12.0$; and $ff/fr<0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
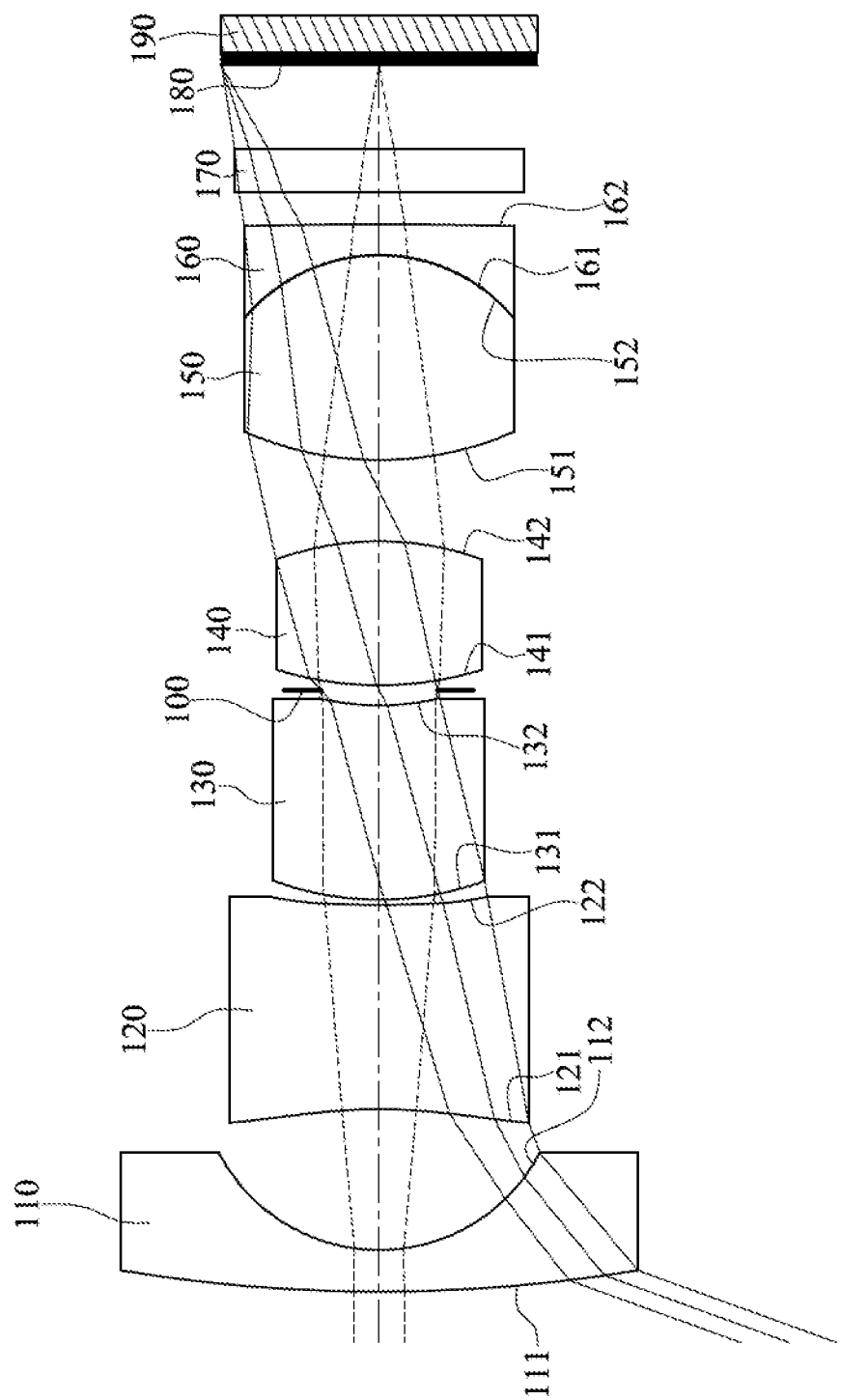
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element. The photographing optical lens assembly has a total of six lens elements.

The first lens element has negative refractive power. Therefore, it is favorable for providing the photographing optical lens assembly with a retrofocus configuration so as to obtain a wide imaging area.

The second lens element has negative refractive power. Therefore, it is favorable for balancing the negative refractive power distribution of the first lens element and the second lens element so as to prevent aberrations generated due to overly strong refractive power of the first lens element.

The third lens element can have negative refractive power and an image-side surface being concave. Therefore, it is favorable for preventing overloading the refractive power on a single lens element so as to reduce the sensitivity of the photographing optical lens assembly.

The fourth lens element with positive refractive power can have an object-side surface being convex. Therefore, it is favorable for balancing the refractive power distribution of the photographing optical lens assembly so as to provide sufficient capability for convergence of the incident light.

The fifth lens element has positive refractive power. Therefore, it is favorable for balancing the positive refractive power distribution of the fourth lens element and the fifth lens element so as to prevent aberrations generated due to overly strong refractive power of the fourth lens element.

The sixth lens element has negative refractive power. Therefore, it is favorable for correcting chromatic aberration so as to reduce the difference among the focusing positions with different light wavelengths, thereby improving the image quality.

When a focal length of the first lens element is f1, a focal length of the second lens element is f2, a focal length of the third lens element is f3, the following condition is satisfied: $|f1|<|f2|<|f3|$. Therefore, it is favorable for a gradual decremental arrangement in refractive power of the lens elements of the photographing optical lens assembly from the object side to the image side so as to prevent excessive aberrations.

When a central thickness of the third lens element is CT3, a central thickness of the sixth lens element is CT6, the following condition is satisfied: $0<CT6/CT3<0.80$. Therefore, it is favorable for the spacing of the lens elements of the photographing optical lens assembly and an easier lens assembling process so as to improve the image quality. Preferably, the following condition can also be satisfied: $0<CT6/CT3<0.35$.

The photographing optical lens assembly further includes an aperture stop, and there is at least one of the lens elements of the photographing optical lens assembly located between an imaged object and the aperture stop. When a curvature radius of a surface closest to the aperture stop among all surfaces of the at least one of the lens elements located between the imaged object and the aperture stop is Rsf, a focal length of the photographing optical lens assembly is f, the following condition is satisfied: $-1.5<Rsf/f$. Therefore, it is favorable for the light to transmit through the aperture stop with a proper incident angle so as to provide a sharp focus on an image surface. Preferably, the following condition can also be satisfied: $0<Rsf/f$. According to the disclosure, among the first through sixth lens elements, there can be one or more lens elements located between the imaged object and the aperture stop. When there is only one lens element located between the imaged object and the aperture stop, a curvature radius of an image-side surface of this lens element is Rsf. When there are multiple lens elements located between the imaged object and the aperture stop, a curvature radius of an image-side surface of the lens element closest to the aperture stop among all the lens elements between the imaged object and the aperture stop is Rsf.

When the central thickness of the third lens element is CT3, a minimum central thickness among central thicknesses of all lens elements of the photographing optical lens assembly is CTmin, the following condition is satisfied: $4.0<CT3/CTmin<12.0$. Therefore, it is favorable for providing the lens elements disposed in the middle section of the photographing optical lens assembly with sufficient central thicknesses so as to prevent deformation due to interference in the assembling process, thereby increasing the assembling yield rate.

There may be a front lens group comprising every lens element located between the imaged object and the aperture stop in the photographing optical lens assembly, and a rear lens group comprising every lens element located between the aperture stop and the image surface in the photographing optical lens assembly. When a focal length of the front lens group is ff, a focal length of the rear lens group is fr, the following condition is satisfied: ff/fr<0. Therefore, it is favorable for obtaining a retrofocus configuration so as to enlarge the field of view, and thereby the photographing optical lens assembly becomes applicable to more applications. Preferably, the following condition can also be satisfied: −1.0<ff/fr<−0.20. According to the disclosure, either of the front lens group or the rear lens group may include one or more lens elements. When the front or rear lens group includes only one lens element, the focal length of the front or rear lens group is equal to a focal length of the lens element. When the front or rear lens group includes multiple lens elements, the focal length of the front or rear lens group is equal to a composite focal length of the lens elements.

When a curvature radius of an object-side surface of the third lens element is R5, a curvature radius of the image-side surface of the third lens element is R6, the following condition can be satisfied: −0.20<(R5−R6)/(R5+R6)<0.35. Therefore, it is favorable for reducing the directional deviation between the traveling light rays of the tangential space and the sagittal space so as to correct astigmatism.

When a central thickness of the lens element having the weakest refractive power among all lens elements of the photographing optical lens assembly is CTPmin, a central thickness of the lens element having the strongest refractive power among all lens elements of the photographing optical lens assembly is CTPmax, the following condition can be satisfied: 0.90<CTPmin/CTPmax<10.0. Therefore, it is favorable for arranging the central thicknesses of the lens elements and balancing the refractive power distribution of the photographing optical lens assembly so as to further improve the image quality. The refractive power of a lens element is defined as a ratio of the focal length of the photographing optical lens assembly to the focal length of the lens element. The lens element with the strongest refractive power can be defined by having the largest absolute value of refractive power among all lens elements.

When the central thickness of the third lens element is CT3, a maximum central thickness among central thicknesses of all lens elements of the photographing optical lens assembly is CTmax, the following condition can be satisfied: 0.85<CT3/CTmax≤1.0. Therefore, it is favorable for the homogeneity of the lens molding while keeping the photographing optical lens assembly compact.

When the focal length of the first lens element is f1, the focal length of the second lens element is f2, the focal length of the third lens element is f3, a focal length of the fourth lens element is f4, the following condition can be satisfied: (|f1|+|f2|+|f4|)/|f3|<1.0. Therefore, it is favorable for arranging the refractive power of the photographing optical lens assembly so as to reduce the sensitivity.

When the focal length of the photographing optical lens assembly is f, an axial distance between an object-side surface of the first lens element and the image surface is TL, the following condition can be satisfied: 0<f/TL<0.20. Therefore, it is favorable for reducing a total track length of the photographing optical lens assembly so as to maintain a compact size thereof.

When the focal length of the photographing optical lens assembly is f, the following condition can be satisfied: 2.0 millimeters<f<6.0 millimeters. Therefore, it is favorable for keeping the photographing optical lens assembly compact so as to become applicable to a compact electronic device.

When the focal length of the first lens element is f1, the focal length of the second lens element is f2, the focal length of the third lens element is f3, the focal length of the fourth lens element is f4, a focal length of the fifth lens element is f5, a focal length of the sixth lens element is f6, a focal length of the i-th lens element is fi, the following condition can be satisfied: |f3|>|fi|; wherein i=1, 2, 4, 5, 6. Therefore, it is favorable for properly arranging the refractive power of the lens elements so as to reduce the incident angle of the light at the off-axial region, thereby correcting aberrations.

When the focal length of the fourth lens element is f4, the focal length of the fifth lens element is f5, the following condition can be satisfied: 0<f4/f5<1.5. Therefore, it is favorable for balancing the refractive power distribution of the fourth lens element and the fifth lens element so as to obtain sufficient capability to converge the incident light.

When the focal length of the photographing optical lens assembly is f, the focal length of the third lens element is f3, the following condition can be satisfied: −0.30<f/f3<0.30. Therefore, the refractive power of the third lens element is favorable for correcting aberrations and keeping the photographing optical lens assembly compact. Preferably, the following condition can also be satisfied: −0.15<f/f3<0.15.

When the curvature radius of the image-side surface of the third lens element is R6, the central thickness of the third lens element is CT3, the following condition can be satisfied: 0<R6/CT3<2.5. Therefore, it is favorable for the third lens element to correct spherical aberration and to provide sufficient structural strength so as to reduce the sensitivity of the photographing optical lens assembly. Preferably, the following condition can also be satisfied: 0<R6/CT3<1.8.

When a composite focal length of the first lens element and the second lens element is f12, the focal length of the photographing optical lens assembly is f, the following condition can be satisfied: −1.45<f12/f<−0.70. Therefore, it is favorable for balancing wide-angle and short back focal length characteristics.

According to the disclosure, an axial distance between the first lens element and the second lens element can be the largest among all axial distances between every two lens elements of the photographing optical lens assembly that are adjacent to each other. Therefore, it is favorable for reducing the variance of the incident angle of the light at a large view angle so as to correct aberrations.

When an Abbe number of the third lens element is V3, an Abbe number of the fifth lens element is V5, an Abbe number of the sixth lens element is V6, the following condition can be satisfied: 0.30<(V3+V6)/V5<1.0. Therefore, it is favorable for correcting chromatic aberration.

When the curvature radius of the object-side surface of the third lens element is R5, the curvature radius of the image-side surface of the third lens element is R6, the following condition can be satisfied: |R5|>|R6|. Therefore, it is favorable for moving the principal point of the third lens element towards the image side of the photographing optical lens assembly to obtain a wider view angle.

When a curvature radius of an object-side surface of the fifth lens element is R9, a curvature radius of an image-side surface of the fifth lens element is R10, the following condition can be satisfied: |R9|>|R10|. Therefore, it is favorable for moving the principal point of the fifth lens element towards the image side of the photographing optical lens assembly so as to obtain wide angle characteristic.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing optical lens assembly can also be reduced. The lens element made of glass material is favorable for reducing the sensitivity of the photographing optical lens assembly, and the lens element made of plastic material is easily shaped for correcting aberrations.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly on the corresponding image sensor can be flat or curved, particularly a concave curved surface facing towards the object side of the photographing optical lens assembly.

According to the present disclosure, the photographing optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned photographing optical lens assembly and an image sensor, wherein the image sensor is disposed on the image side and can be located on or near an image surface of the aforementioned photographing optical lens assembly. In some embodiments, the image capturing unit can further include a barrel member, a holding member or a combination thereof.

Figure 21:
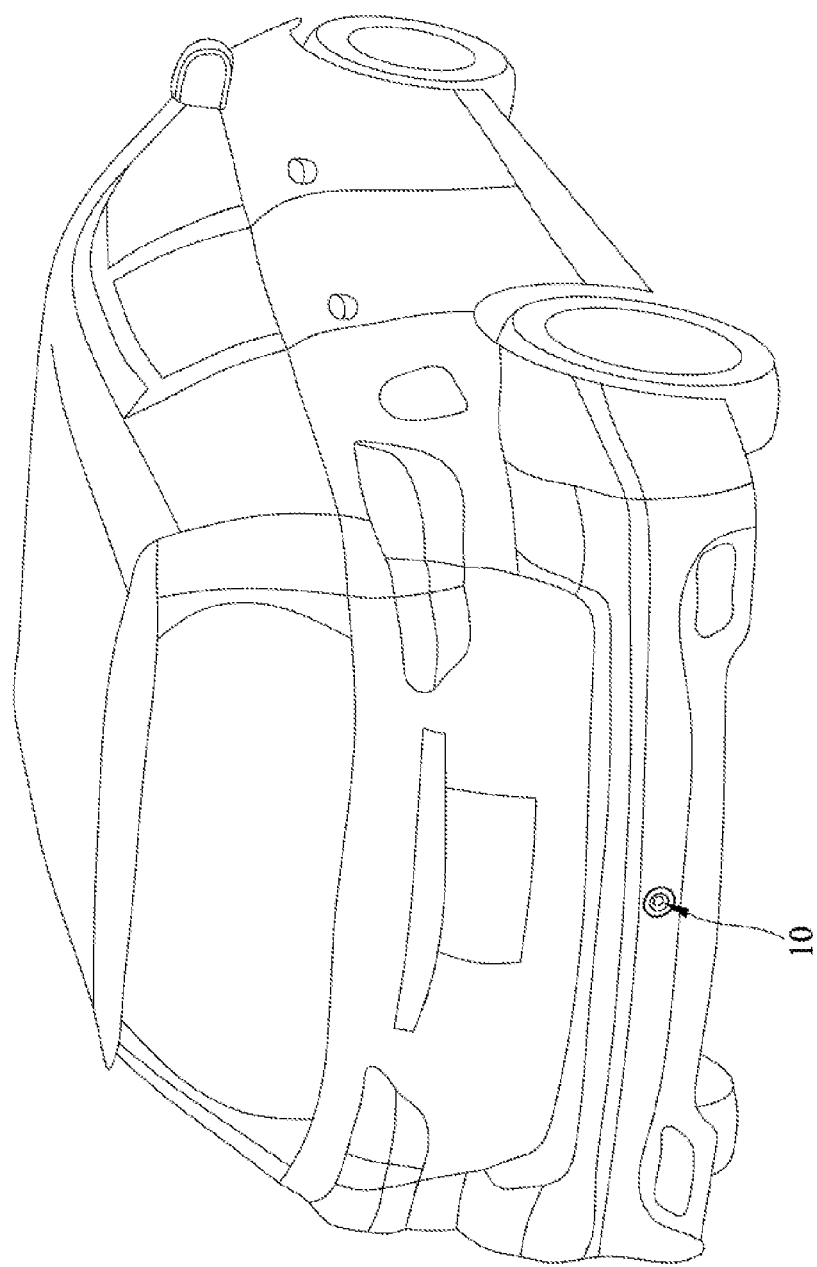
FIG. 21 shows an electronic device according to one embodiment.
Figure 22:
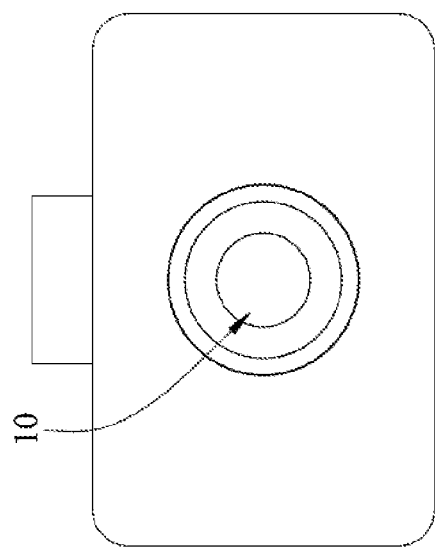
FIG. 22 shows an electronic device according to another embodiment.
Figure 23:
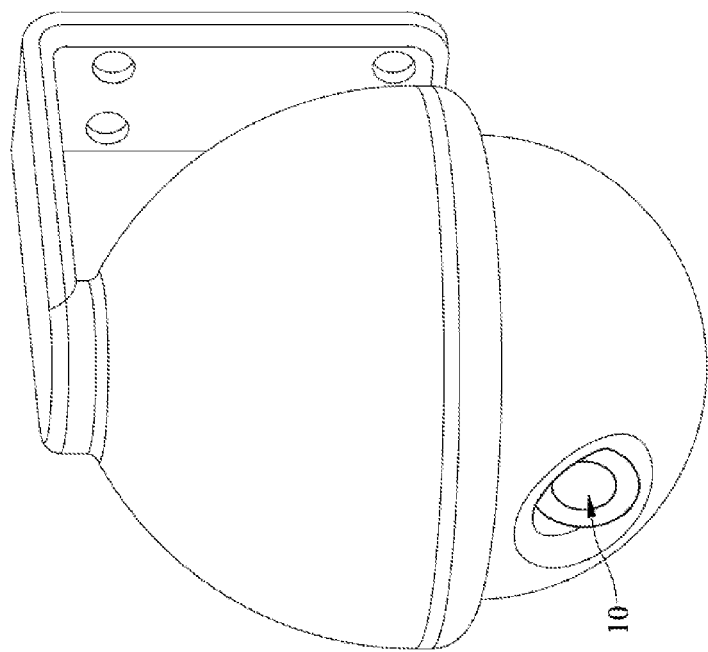
FIG. 23 shows an electronic device according to still another embodiment.

In FIG. 21, FIG. 22, and FIG. 23, an image capturing unit 10 may be installed in, but not limited to, an electronic device, including a vehicle backup camera (FIG. 21), a dashboard camera (FIG. 22) or a surveillance device (FIG. 23). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
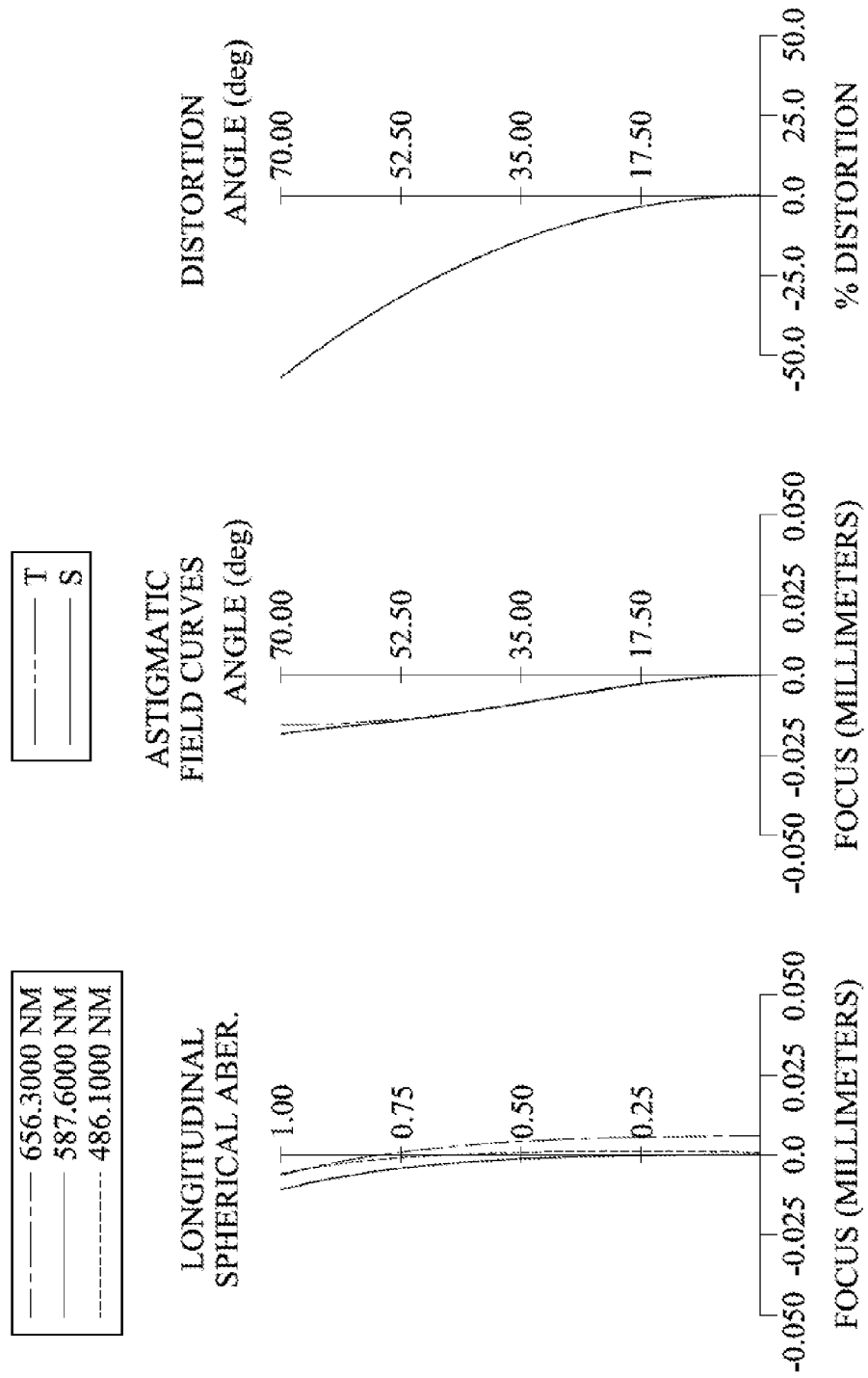
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image surface 180, wherein the photographing optical lens assembly has a total of six lens elements (110-160). A front lens group of the photographing optical lens assembly includes the first lens element 110, the second lens element 120 and the third lens element 130, and a rear lens group of the photographing optical lens assembly includes the fourth lens element 140, the fifth lens element 150 and the sixth lens element 160.

The first lens element 110 with negative refractive power has an object-side surface 111 being convex and an image-side surface 112 being concave. The first lens element 110 is made of glass material and has the object-side surface 111 and the image-side surface 112 being both spherical.

The second lens element 120 with negative refractive power has an object-side surface 121 being concave and an image-side surface 122 being concave. The second lens element 120 is made of plastic material and has the object-side surface 121 and the image-side surface 122 being both aspheric.

The third lens element 130 with positive refractive power has an object-side surface 131 being convex and an image-side surface 132 being concave. The third lens element 130 is made of glass material and has the object-side surface 131 and the image-side surface 132 being both spherical.

The fourth lens element 140 with positive refractive power has an object-side surface 141 being convex and an image-side surface 142 being convex. The fourth lens element 140 is made of glass material and has the object-side surface 141 and the image-side surface 142 being both spherical.

The fifth lens element 150 with positive refractive power has an object-side surface 151 being convex and an image-side surface 152 being convex. The fifth lens element 150 is made of glass material and has the object-side surface 151 and the image-side surface 152 being both spherical.

The sixth lens element 160 with negative refractive power has an object-side surface 161 being concave and an image-side surface 162 being convex. The sixth lens element 160 is made of glass material and has the object-side surface 161 and the image-side surface 162 being both spherical. The image-side surface 152 of the fifth lens element 150 is cemented to the object-side surface 161 of the sixth lens element 160.

The IR-cut filter 170 is made of glass material and located between the sixth lens element 160 and the image surface 180, and will not affect the focal length of the photographing optical lens assembly. The image sensor 190 is disposed on or near the image surface 180 of the photographing optical lens assembly.

In this embodiment, an axial distance between the first lens element 110 and the second lens element 120 is larger than an axial distance between the second lens element 120 and the third lens element 130, an axial distance between the third lens element 130 and the fourth lens element 140, an axial distance between the fourth lens element 140 and the fifth lens element 150 and an axial distance between the fifth lens element 150 and the sixth lens element 160. That is, the axial distance between the first lens element 110 and the second lens element 120 is the largest among all axial distances between every two lens elements of the photographing optical lens assembly that are adjacent to each other.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=2.79 millimeters (mm); Fno=2.85; and HFOV=70.0 degrees (deg.).

When an Abbe number of the third lens element 130 is V3, an Abbe number of the fifth lens element 150 is V5, an Abbe number of the sixth lens element 160 is V6, the following condition is satisfied: (V3+V6)/V5=0.79.

When a central thickness of the third lens element 130 is CT3, a central thickness of the sixth lens element 160 is CT6, the following condition is satisfied: CT6/CT3=0.16.

When the central thickness of the third lens element 130 is CT3, a minimum central thickness among central thicknesses of all lens elements (110-160) of the photographing optical lens assembly is CTmin, the following condition is satisfied: CT3/CTmin=6.34. In this embodiment, the central thickness of the sixth lens element 160 is the smallest among the central thicknesses of all lens elements (110-160); thereby, CTmin is equal to the central thickness of the sixth lens element 160.

When the central thickness of the third lens element 130 is CT3, a maximum central thickness among central thicknesses of all lens elements (110-160) of the photographing optical lens assembly is CTmax, the following condition is satisfied: CT3/CTmax=0.95. In this embodiment, the central thickness of the second lens element 120 is the largest among the central thicknesses of all lens elements (110-160); thereby, CTmax is equal to the central thickness of the second lens element 120.

When a central thickness of the lens element having the weakest refractive power among all lens elements (110-160) of the photographing optical lens assembly is CTPmin, a central thickness of the lens element having the strongest refractive power among all lens elements (110-160) of the photographing optical lens assembly is CTPmax, the following condition is satisfied: CTPmin/CTPmax=6.34. In this embodiment, the third lens element 130 has the weakest refractive power among all lens elements (110-160), and the sixth lens element 160 has the strongest refractive power among all lens elements (110-160); thereby, CTPmin is equal to the central thickness of the third lens element 130, and CTPmax is equal to the central thickness of the sixth lens element 160.

When a curvature radius of the image-side surface 132 of the third lens element 130 is R6, the central thickness of the third lens element 130 is CT3, the following condition is satisfied: R6/CT3=1.36.

When a curvature radius of the object-side surface 131 of the third lens element 130 is R5, the curvature radius of the image-side surface 132 of the third lens element 130 is R6, the following condition is satisfied: (R5−R6)/(R5+R6)=0.07.

When a curvature radius of the surface closest to the aperture stop among all surfaces of the lens elements of the photographing optical lens assembly between an imaged object and the aperture stop 100 is Rsf, the focal length of the photographing optical lens assembly is f, the following condition is satisfied: Rsf/f=1.86. In this embodiment, the first lens element 110, the second lens element 120 and the third lens element 130 are located between the imaged object and the aperture stop 100, and the image-side surface 132 of the third lens element 130 is the closest to the aperture stop 100 among the surfaces (111, 112, 121, 122, 131, 132); thereby, Rsf is equal to the curvature radius of the image-side surface 132 of the third lens element 130.

When the focal length of the photographing optical lens assembly is f, a focal length of the third lens element 130 is f3, the following condition is satisfied: f/f3=0.07.

When a focal length of the fourth lens element 140 is f4, a focal length of the fifth lens element 150 is f5, the following condition is satisfied: f4/f5=1.07.

When the focal length of the photographing optical lens assembly is f, a composite focal length of the first lens element 110 and the second lens element 120 is f12, the following condition is satisfied: f12/f=−1.12.

When a focal length of the first lens element 110 is f1, a focal length of the second lens element 120 is f2, the focal length of the third lens element 130 is f3, the focal length of the fourth lens element 140 is f4, the following condition is satisfied: (|f1|+|f2|+|f4|)/|f3|=0.56.

When a focal length of the front lens group is ff, a focal length of the rear lens group is fr, the following condition is satisfied: ff/fr=−0.73. In this embodiment, ff is equal to a composite focal length of the first lens element 110, the second lens element 120 and the third lens element 130.

Moreover, fr is equal to a composite focal length of the fourth lens element 140, the fifth lens element 150 and the sixth lens element 160.

When the focal length of the photographing optical lens assembly is f, an axial distance between the object-side surface 111 of the first lens element 110 and the image surface 180 is TL, the following condition is satisfied: f/TL=0.12.

The detailed optical data of the 1st embodiment are shown in Table 1 and the aspheric surface data are shown in Table 2 below.

TABLE 1

1st Embodiment
f = 2.79 mm, Fno = 2.85, HFOV = 70.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 30.600 | 0.814 | Glass | 1.729 | 54.5 | −5.55 |
| 2 | | 3.533 | 2.757 | | | | |
| 3 | Lens 2 | −10.038 (ASP) | 4.000 | Plastic | 1.634 | 23.8 | −11.32 |
| 4 | | 29.099 (ASP) | 0.100 | | | | |
| 5 | Lens 3 | 5.968 | 3.801 | Glass | 1.847 | 23.8 | 38.09 |
| 6 | | 5.185 | 0.299 | | | | |
| 7 | Ape. Stop | Plano | 0.100 | Glass | | | |
| 8 | Lens 4 | 6.767 | 2.814 | | 1.754 | 52.3 | 4.59 |
| 9 | | −5.821 | 1.593 | | | | |
| 10 | Lens 5 | 6.550 | 4.000 | Glass | 1.620 | 60.3 | 4.28 |
| 11 | | −3.425 | 0.010 | Cement | 1.514 | 38.8 | |
| 12 | Lens 6 | −3.425 | 0.600 | Glass | 1.847 | 23.8 | −4.17 |
| 13 | | −125.374 | 0.628 | | | | |
| 14 | IR-cut filter | Plano | 0.850 | Glass | 1.517 | 64.2 | — |
| 15 | | Plano | 1.638 | | | | |
| 16 | Image | Plano | — | | | | |

Note:
Reference wavelength is 587.6 nm (d-line).

TABLE 2

Aspheric Coefficients

| Surface # | 3 | 4 |
|---|---|---|
| k = | −9.9121E+00 | −7.3125E+00 |
| A4 = | 1.4688E−03 | 3.8156E−03 |
| A6 = | −1.9538E−05 | 6.6725E−05 |
| A8 = | 1.3470E−06 | 2.8838E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A8 represent the aspheric coefficients ranging from the 4th order to the 8th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
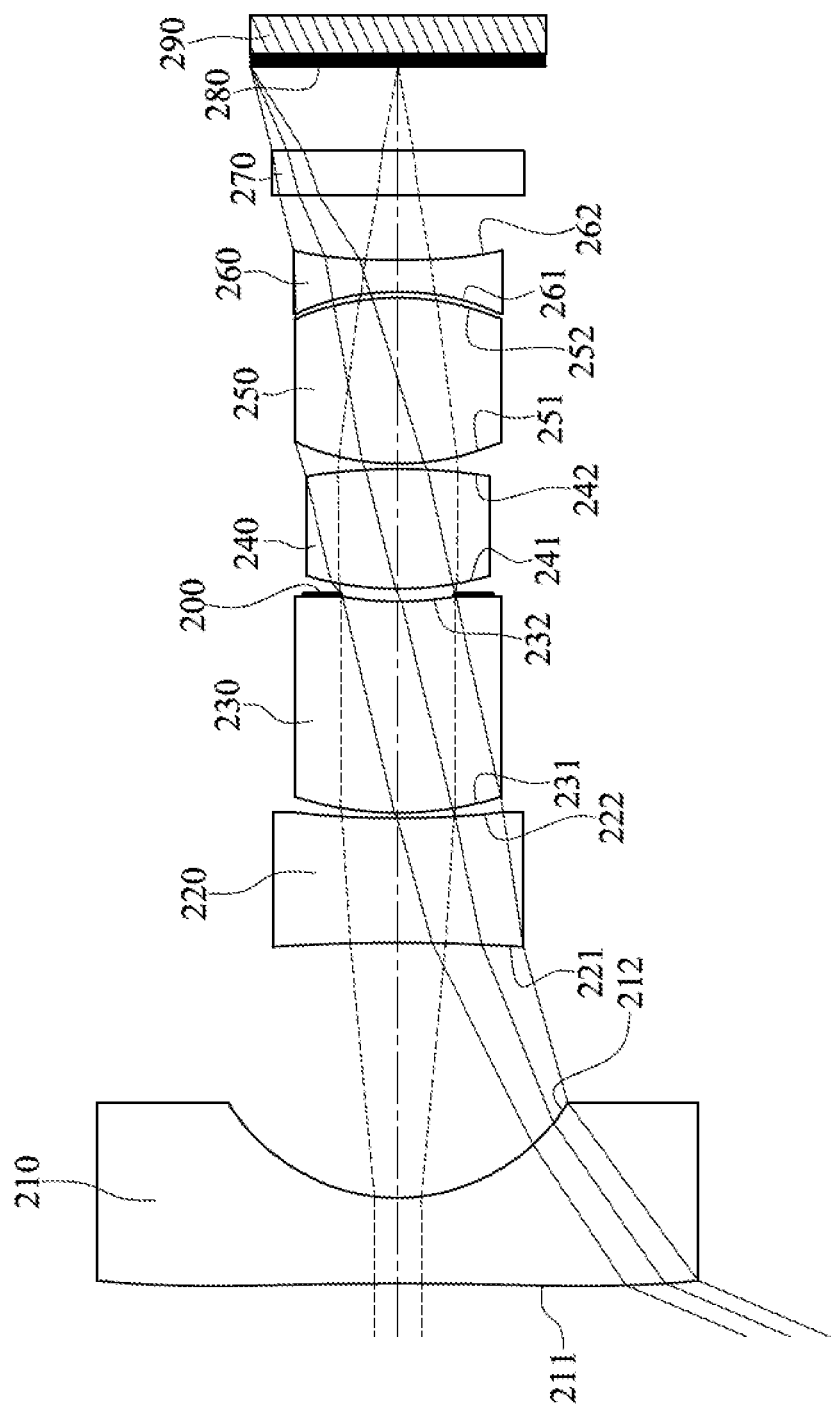
FIG. 3 is a schematic view of an image capturing unit according to the 2nd embodiment of the present disclosure.
Figure 4:
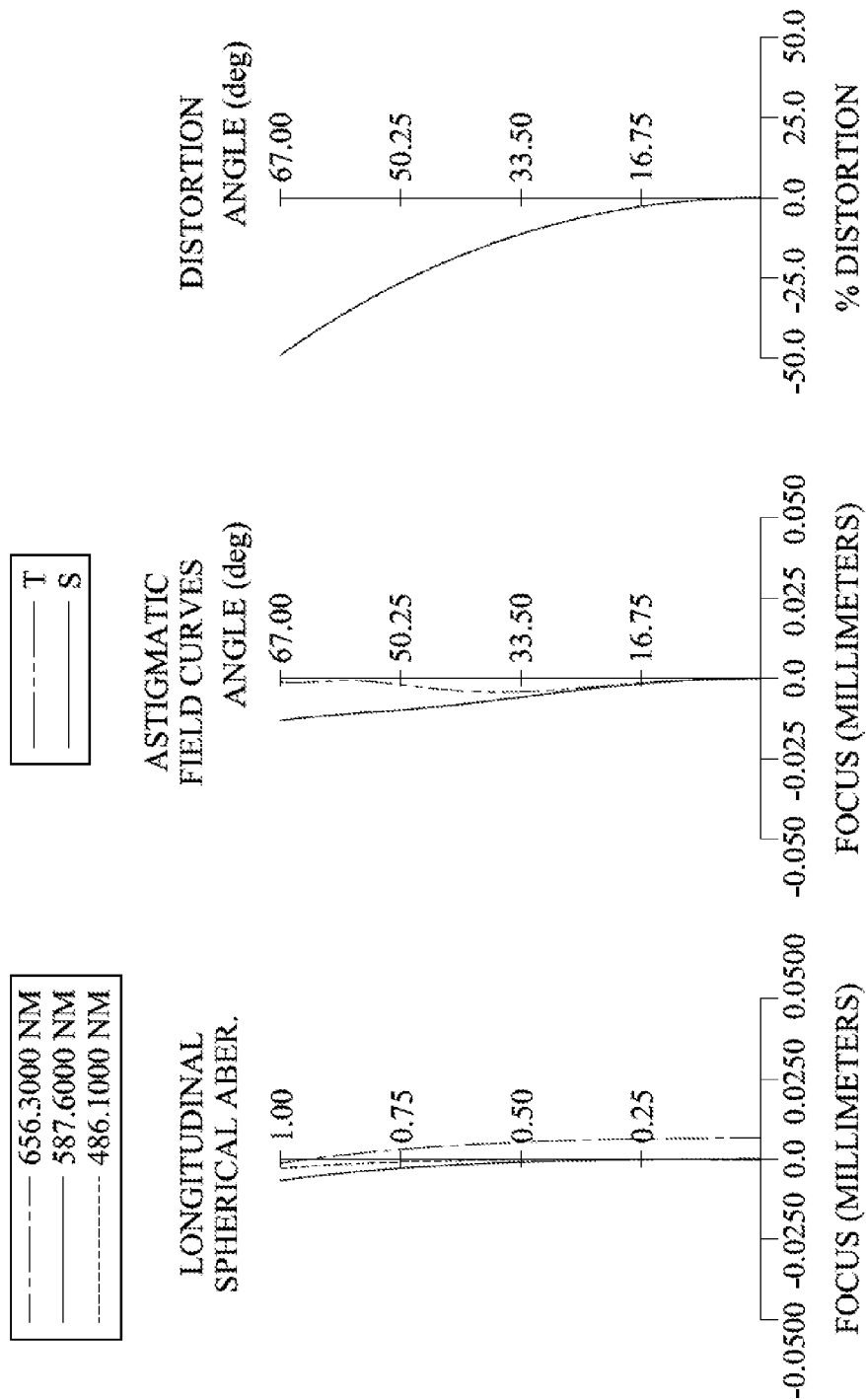
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, a first lens element 210, a second lens element 220, a third lens element 230, an aperture stop 200, a fourth lens element 240, a fifth lens element 250, a sixth lens element 260, an IR-cut filter 270 and an image surface 280, wherein the photographing optical lens assembly has a total of six lens elements (210-260). A front lens group of the photographing optical lens assembly includes the first lens element 210, the second lens element 220 and the third lens element 230, and a rear lens group of the photographing optical lens assembly includes the fourth lens element 240, the fifth lens element 250 and the sixth lens element 260.

The first lens element 210 with negative refractive power has an object-side surface being 211 concave and an image-side surface 212 being concave. The first lens element 210 is made of glass material and has the object-side surface 211 and the image-side surface 212 being both aspheric.

The second lens element 220 with negative refractive power has an object-side surface 221 being concave and an image-side surface 222 being concave. The second lens element 220 is made of plastic material and has the object-side surface 221 and the image-side surface 222 being both aspheric.

The third lens element 230 with positive refractive power has an object-side surface 231 being convex and an image-side surface 232 being concave. The third lens element 230 is made of glass material and has the object-side surface 231 and the image-side surface 232 being both spherical.

The fourth lens element 240 with positive refractive power has an object-side surface 241 being convex and an image-side surface 242 being convex. The fourth lens element 240 is made of glass material and has the object-side surface 241 and the image-side surface 242 being both spherical.

The fifth lens element 250 with positive refractive power has an object-side surface 251 being convex and an image-side surface 252 being convex. The fifth lens element 250 is made of glass material and has the object-side surface 251 and the image-side surface 252 being both spherical.

The sixth lens element 260 with negative refractive power has an object-side surface 261 being concave and an image-side surface 262 being concave. The sixth lens element 260 is made of plastic material and has the object-side surface 261 and the image-side surface 262 being both aspheric.

The IR-cut filter 270 is made of glass material and located between the sixth lens element 260 and the image surface 280, and will not affect the focal length of the photographing optical lens assembly. The image sensor 290 is disposed on or near the image surface 280 of the photographing optical lens assembly.

In this embodiment, an axial distance between the first lens element 210 and the second lens element 220 is the largest among all axial distances between every two lens elements of the photographing optical lens assembly that are adjacent to each other.

The detailed optical data of the 2nd embodiment are shown in Table 3 and the aspheric surface data are shown in Table 4 below.

Moreover, these parameters can be calculated from Table 3 and Table 4 as the following values and satisfy the following conditions:

| 2nd Embodiment | | | |
|---|---|---|---|
| f [mm] | 2.46 | (R5 − R6)/(R5 + R6) | 0.03 |
| Fno | 2.80 | Rsf/f | 2.48 |
| HFOV [deg.] | 67.0 | f/f3 | 0.07 |
| (V3 + V6)/V5 | 0.73 | f4/f5 | 1.26 |
| CT6/CT3 | 0.15 | f12/f | −1.31 |
| CT3/CTmin | 6.67 | (|f1| + |f2| + |f4|)/|f3| | 1.01 |
| CT3/CTmax | 1.00 | ff/fr | −0.85 |
| CTPmin/CTPmax | 1.27 | f/TL | 0.11 |
| R6/CT3 | 1.52 | | |

TABLE 3

2nd Embodiment
f = 2.46 mm, Fno = 2.80, HFOV = 67.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −63.654 (ASP) | 1.630 | Glass | 1.729 | 54.5 | −4.71 |
| 2 | | 3.674 (ASP) | 4.841 | | | | |
| 3 | Lens 2 | −46.117 (ASP) | 2.373 | Plastic | 1.634 | 23.8 | −22.95 |
| 4 | | 21.681 (ASP) | 0.100 | | | | |
| 5 | Lens 3 | 6.513 | 4.000 | Glass | 1.847 | 23.8 | 33.14 |
| 6 | | 6.093 | 0.143 | | | | |
| 7 | Ape. Stop | Plano | 0.100 | | | | |
| 8 | Lens 4 | 6.291 | 2.273 | Glass | 1.754 | 52.3 | 5.67 |
| 9 | | −11.240 | 0.100 | | | | |
| 10 | Lens 5 | 4.871 | 3.147 | Glass | 1.620 | 60.3 | 4.51 |
| 11 | | −4.953 | 0.114 | | | | |
| 12 | Lens 6 | −5.253 (ASP) | 0.600 | Plastic | 1.660 | 20.4 | −5.83 |
| 13 | | 15.034 (ASP) | 1.230 | | | | |
| 14 | IR-cut filter | Plano | 0.850 | Glass | 1.517 | 64.2 | — |
| 15 | | Plano | 1.610 | | | | |
| 16 | Image | Plano | — | | | | |

Note:
Reference wavelength is 587.6 nm (d-line).

TABLE 4

Aspheric Coefficients

| Surface # | 1 | 2 | 3 |
|---|---|---|---|
| k = | −2.0000E+01 | 2.7145E−02 | 1.0000E+01 |
| A4 = | 3.5315E−04 | −8.2479E−04 | −7.5376E−04 |
| A6 = | −2.1072E−06 | −2.2970E−05 | 1.5710E−05 |
| A8 = | - | - | 9.9717E−06 |

| Surface # | 4 | 12 | 13 |
|---|---|---|---|
| k = | −2.0000E+01 | 2.0434E+00 | −9.6758E+00 |
| A4 = | 1.1516E−03 | −2.1845E−03 | 2.4897E−03 |
| A6 = | 3.4379E−05 | 3.6623E−04 | 4.2348E−04 |
| A8 = | 1.2408E−05 | — | −8.4241E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

3rd Embodiment

Figure 5:
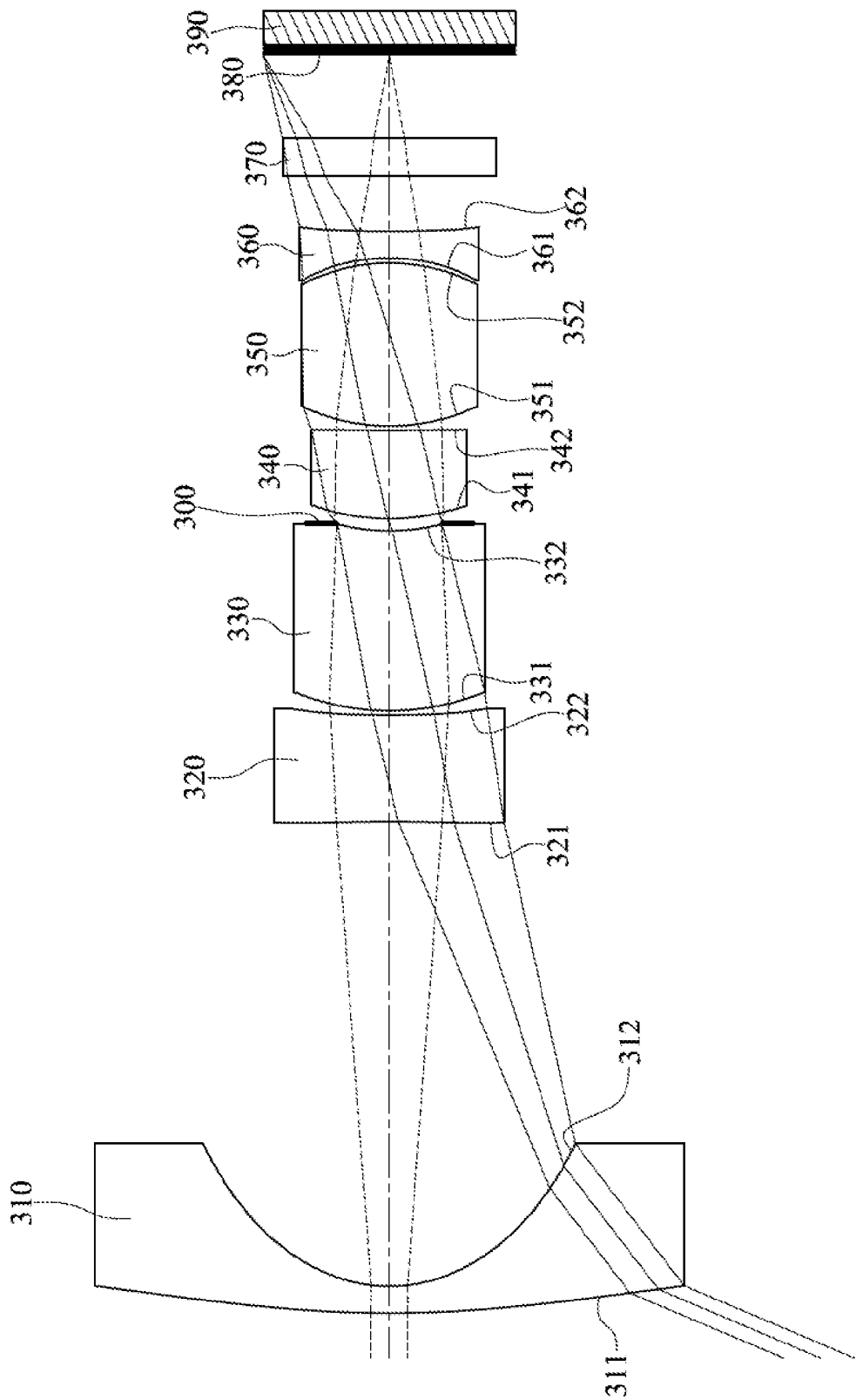
FIG. 5 is a schematic view of an image capturing unit according to the 3rd embodiment of the present disclosure.
Figure 6:
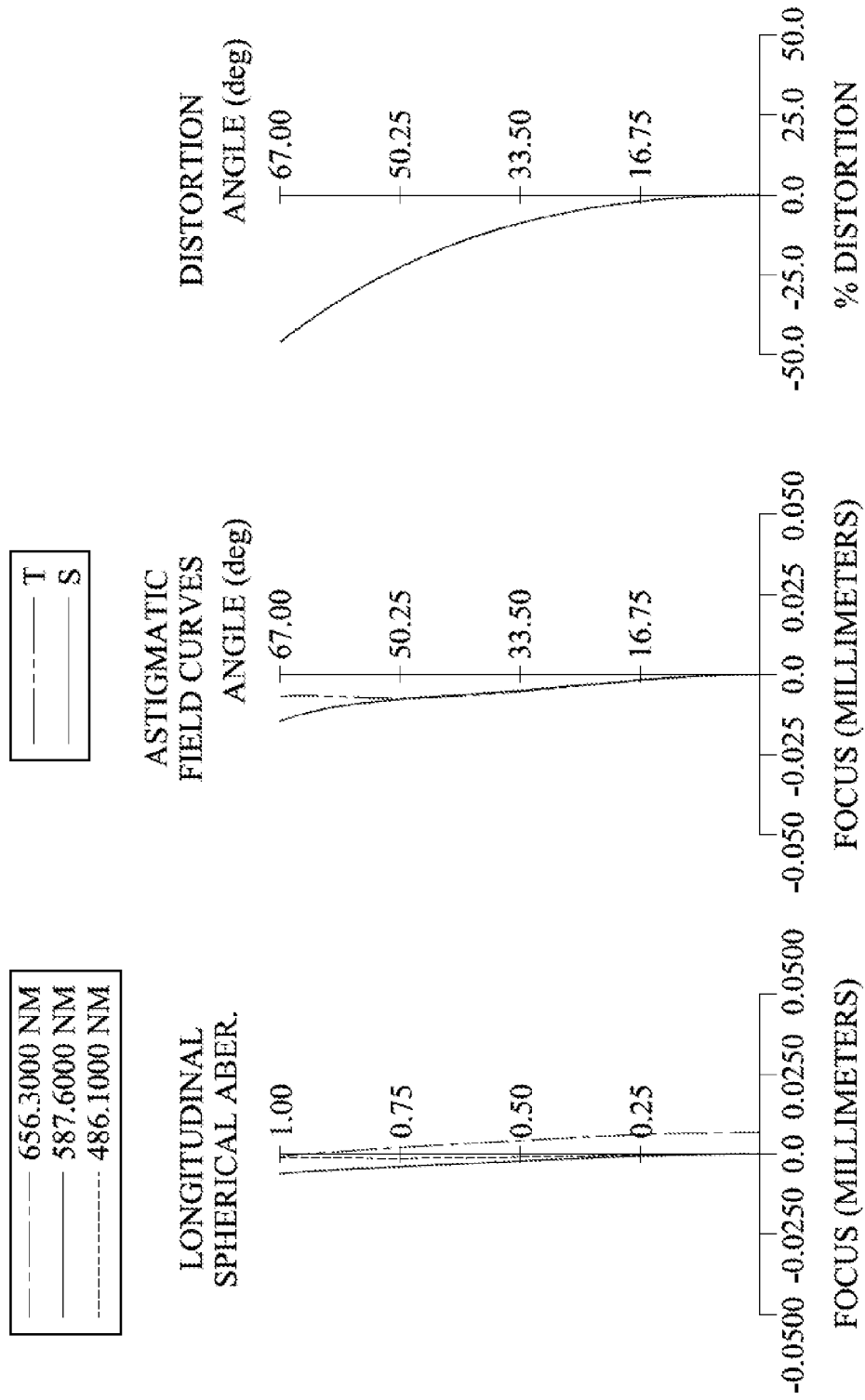
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, a second lens element 320, a third lens element 330, an aperture stop 300, a fourth lens element 340, a fifth lens element 350, a sixth lens element 360, an IR-cut filter 370 and an image surface 380, wherein the photographing optical lens assembly has a total of six lens elements (310-360). A front lens group of the photographing optical lens assembly includes the first lens element 310, the second lens element 320 and the third lens element 330, and a rear lens group of the photographing optical lens assembly includes the fourth lens element 340, the fifth lens element 350 and the sixth lens element 360.

The first lens element 310 with negative refractive power has an object-side surface 311 being convex and an image-side surface 312 being concave. The first lens element 310 is made of glass material and has the object-side surface 311 and the image-side surface 312 being both aspheric.

The second lens element 320 with negative refractive power has an object-side surface 321 being concave and an image-side surface 322 being concave. The second lens element 320 is made of plastic material and has the object-side surface 321 and the image-side surface 322 being both aspheric.

The third lens element 330 with positive refractive power has an object-side surface 331 being convex and an image-side surface 332 being concave. The third lens element 330 is made of glass material and has the object-side surface 331 and the image-side surface 332 being both spherical.

The fourth lens element 340 with positive refractive power has an object-side surface 341 being convex and an image-side surface 342 being concave. The fourth lens element 340 is made of glass material and has the object-side surface 341 and the image-side surface 342 being both spherical.

The fifth lens element 350 with positive refractive power has an object-side surface 351 being convex and an image-side surface 352 being convex. The fifth lens element 350 is made of glass material and has the object-side surface 351 and the image-side surface 352 being both spherical.

The sixth lens element 360 with negative refractive power has an object-side surface 361 being concave and an image-side surface 362 being concave. The sixth lens element 360 is made of plastic material and has the object-side surface 361 and the image-side surface 362 being both aspheric.

The IR-cut filter 370 is made of glass material and located between the sixth lens element 360 and the image surface 380, and will not affect the focal length of the photographing optical lens assembly. The image sensor 390 is disposed on or near the image surface 380 of the photographing optical lens assembly.

In this embodiment, an axial distance between the first lens element 310 and the second lens element 320 is the largest among all axial distances between every two lens elements of the photographing optical lens assembly that are adjacent to each other.

The detailed optical data of the 3rd embodiment are shown in Table 5 and the aspheric surface data are shown in Table 6 below.

TABLE 5

3rd Embodiment
f = 2.30 mm, Fno = 2.80, HFOV = 67.0 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Lens 1 | 24.753 (ASP) | 0.600 | Glass | 1.729 | 54.5 | −5.57 |
| 2 |  | 3.452 (ASP) | 10.336 |  |  |  |  |
| 3 | Lens 2 | −41.186 (ASP) | 2.373 | Plastic | 1.634 | 23.8 | −23.83 |
| 4 |  | 24.388 (ASP) | 0.100 |  |  |  |  |
| 5 | Lens 3 | 5.612 | 4.000 | Glass | 1.847 | 23.8 | 39.65 |
| 6 |  | 4.537 | 0.175 |  |  |  |  |
| 7 | Ape. Stop | Plano | 0.100 |  |  |  |  |
| 8 | Lens 4 | 5.104 | 1.960 | Glass | 1.754 | 52.3 | 7.14 |
| 9 |  | 82.169 | 0.100 |  |  |  |  |
| 10 | Lens 5 | 4.530 | 3.628 | Glass | 1.620 | 60.3 | 4.18 |
| 11 |  | −4.201 | 0.108 |  |  |  |  |
| 12 | Lens 6 | −4.816 (ASP) | 0.600 | Plastic | 1.660 | 20.4 | −6.20 |
| 13 |  | 28.437 (ASP) | 1.217 |  |  |  |  |
| 14 | IR-cut filter | Plano | 0.850 | Glass | 1.517 | 64.2 | — |
| 15 |  | Plano | 1.857 |  |  |  |  |
| 16 | Image | Plano | — |  |  |  |  |

Note:
Reference wavelength is 587.6 nm (d-line).

TABLE 6

Aspheric Coefficients

| Surface # | 1 | 2 | 3 |
|---|---|---|---|
| k = | −2.0000E+01 | −5.3838E−01 | −2.0000E+01 |
| A4 = | −5.6409E−05 | 6.7159E−05 | 1.3637E−03 |
| A6 = | 3.1076E−07 | 2.5432E−06 | 2.6743E−05 |
| A8 = | — | — | −6.1896E−07 |

| Surface # | 4 | 12 | 13 |
|---|---|---|---|
| k = | 1.0000E+01 | 2.5390E+00 | −2.0000E+01 |
| A4 = | 1.8849E−03 | −6.5429E−03 | −2.7501E−03 |
| A6 = | 5.6160E−05 | 1.2512E−03 | 1.2963E−03 |
| A8 = | 7.7362E−08 | — | −4.0331E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.30 | (R5 − R6)/(R5 + R6) | 0.11 |
| Fno | 2.80 | Rsf/f | 1.97 |

-continued

3rd Embodiment

| | | | |
|---|---|---|---|
| HFOV [deg.] | 67.0 | f/f3 | 0.06 |
| (V3 + V6)/V5 | 0.73 | f4/f5 | 1.71 |
| CT6/CT3 | 0.15 | f12/f | −1.42 |
| CT3/CTmin | 6.67 | (|f1| + |f2| + |f4|)/|f3| | 0.92 |
| CT3/CTmax | 1.00 | ff/fr | −0.74 |
| CTPmin/CTPmax | 1.10 | f/TL | 0.08 |
| R6/CT3 | 1.13 | | |

4th Embodiment

Figure 7:
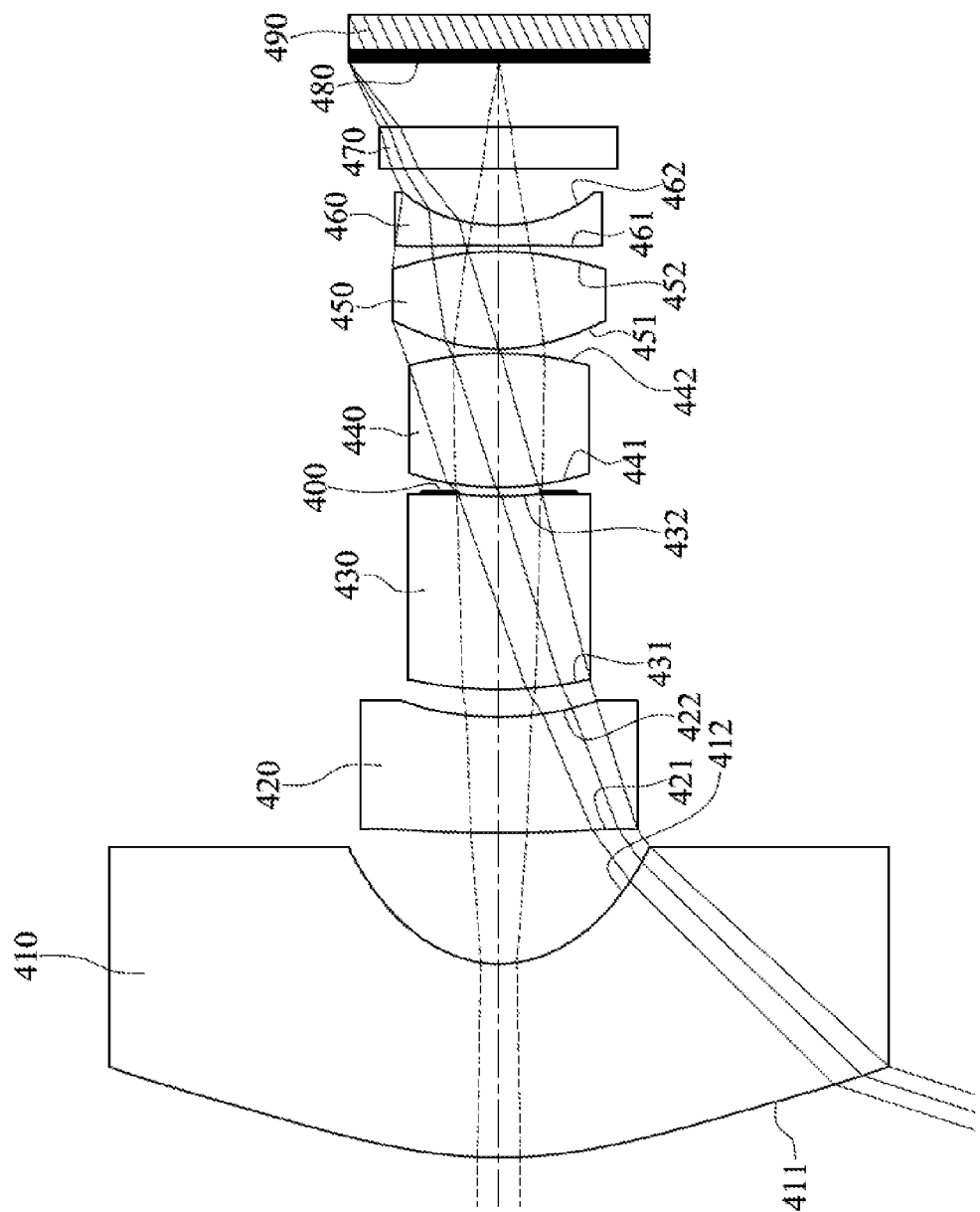
FIG. 7 is a schematic view of an image capturing unit according to the 4th embodiment of the present disclosure.
Figure 8:
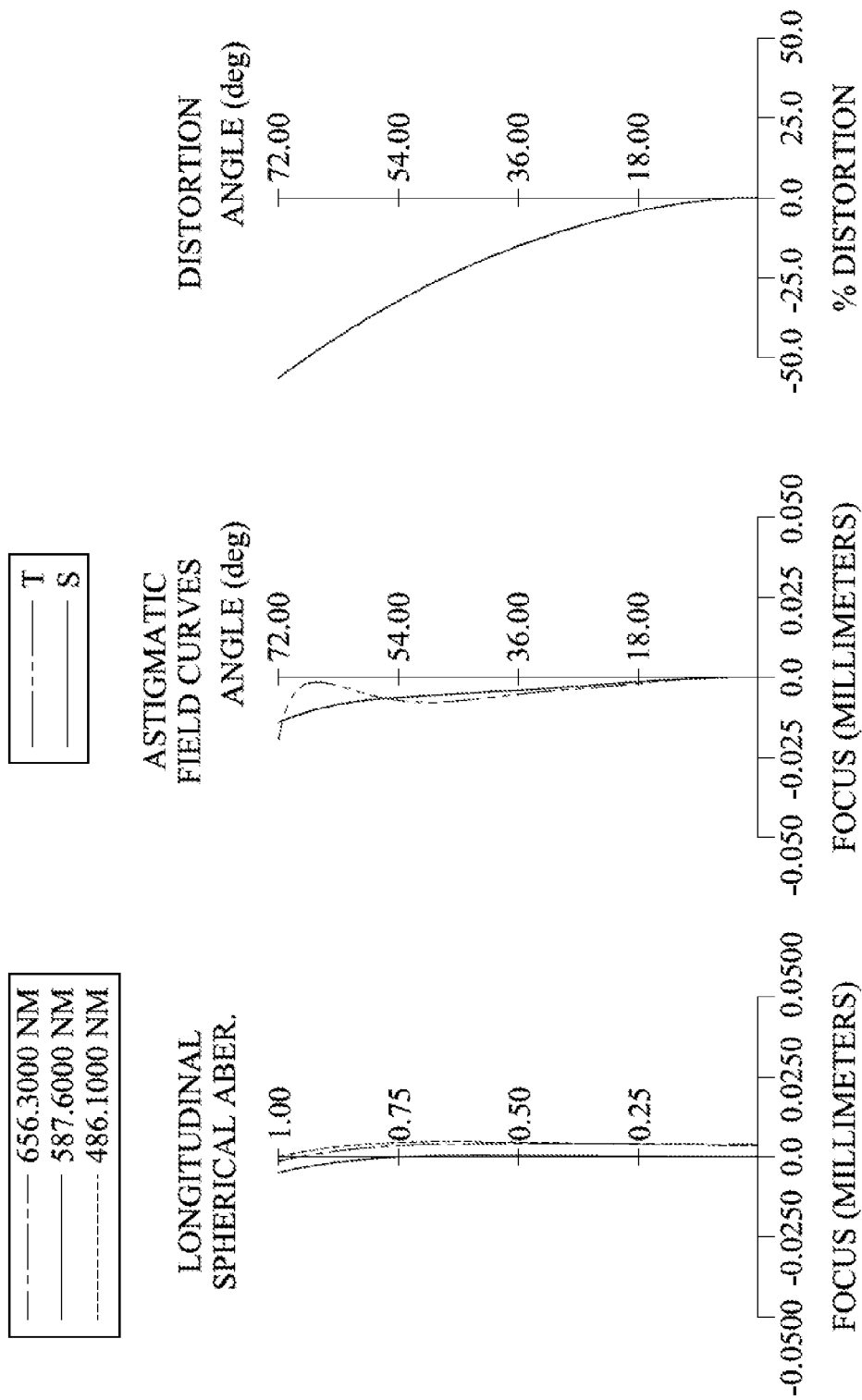
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, a first lens element 410, a second lens element 420, a third lens element 430, an aperture stop 400, a fourth lens element 440, a fifth lens element 450, a sixth lens element 460, a IR-cut filter 470 and an image surface 480, wherein the photographing optical lens assembly has a total of six lens elements (410-460). A front lens group of the photographing optical lens assembly includes the first lens element 410, the second lens element 420 and the third lens element 430, and a rear lens group of the photographing optical lens assembly includes the fourth lens element 440, the fifth lens element 450 and the sixth lens element 460.

The first lens element 410 with negative refractive power has an object-side surface 411 being convex and an image-side surface 412 being concave. The first lens element 410 is made of glass material and has the object-side surface 411 and the image-side surface 412 being both aspheric.

The second lens element 420 with negative refractive power has an object-side surface 421 being convex and an image-side surface 422 being concave. The second lens element 420 is made of plastic material and has the object-side surface 421 and the image-side surface 422 being both aspheric.

The third lens element 430 with positive refractive power has an object-side surface 431 being convex and an image-side surface 432 being concave. The third lens element 430 is made of glass material and has the object-side surface 431 and the image-side surface 432 being both spherical.

The fourth lens element 440 with positive refractive power has an object-side surface 441 being convex and an image-side surface 442 being convex. The fourth lens element 440 is made of glass material and has the object-side surface 441 and the image-side surface 442 being both spherical.

The fifth lens element 450 with positive refractive power has an object-side surface 451 being convex and an image-side surface 452 being convex. The fifth lens element 450 is made of glass material and has the object-side surface 451 and the image-side surface 452 being both aspheric.

The sixth lens element 460 with negative refractive power has an object-side surface 461 being convex and an image-side surface 462 being concave. The sixth lens element 460 is made of plastic material and has the object-side surface 461 and the image-side surface 462 being both aspheric.

The IR-cut filter 470 is made of glass material and located between the sixth lens element 460 and the image surface 480, and will not affect the focal length of the photographing optical lens assembly. The image sensor 490 is disposed on or near the image surface 480 of the photographing optical lens assembly.

In this embodiment, an axial distance between the first lens element 410 and the second lens element 420 is the largest among all axial distances between every two lens elements of the photographing optical lens assembly that are adjacent to each other.

The detailed optical data of the 4th embodiment are shown in Table 7 and the aspheric surface data are shown in Table 8 below.

TABLE 7

4th Embodiment
f = 2.45 mm, Fno = 2.80, HFOV = 72.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.873 (ASP) | 3.957 | Glass | 1.729 | 54.5 | −5.76 |
| 2 | | 2.450 (ASP) | 2.672 | | | | |
| 3 | Lens 2 | 36.364 (ASP) | 2.373 | Plastic | 1.634 | 23.8 | −14.08 |
| 4 | | 6.987 (ASP) | 0.552 | | | | |
| 5 | Lens 3 | 8.374 | 3.957 | Glass | 1.847 | 23.8 | 53.46 |
| 6 | | 8.049 | 0.077 | | | | |
| 7 | Ape. Stop | Plano | 0.100 | | | | |
| 8 | Lens 4 | 5.996 | 2.728 | Glass | 1.754 | 52.3 | 4.71 |
| 9 | | −7.020 | 0.100 | | | | |
| 10 | Lens 5 | 3.833 (ASP) | 1.988 | Glass | 1.620 | 60.3 | 4.22 |
| 11 | | −6.600 (ASP) | 0.118 | | | | |
| 12 | Lens 6 | 80.535 (ASP) | 0.425 | Plastic | 1.660 | 20.4 | −5.59 |
| 13 | | 3.518 (ASP) | 1.143 | | | | |
| 14 | IR-cut filter | Plano | 0.850 | Glass | 1.517 | 64.2 | — |
| 15 | | Plano | 1.348 | | | | |
| 16 | Image | Plano | — | — | | | |

Note:
Reference wavelength is 587.6 nm (d-line).

TABLE 8

Aspheric Coefficients

| Surface # | | | | |
|---|---|---|---|---|
| | 1 | 2 | 3 | 4 |
| k = | −3.4227E+00 | −8.5267E−01 | 1.0000E+01 | 2.4894E+00 |
| A4 = | −3.2557E−04 | 1.1251E−03 | 1.5052E−03 | 2.8515E−03 |
| A6 = | 2.7542E−06 | 2.6011E−04 | −1.9044E−04 | −3.5940E−04 |
| A8 = | — | — | −9.4086E−06 | 1.5459E−05 |

| Surface # | | | | |
|---|---|---|---|---|
| | 10 | 11 | 12 | 13 |
| k = | −7.7603E−01 | −1.8274E−01 | −2.0000E+01 | −8.3346E−01 |
| A4 = | −5.8409E−04 | −2.4204E−03 | −8.6194E−03 | 2.6890E−03 |
| A6 = | −2.9489E−04 | 6.2427E−04 | 1.9032E−03 | 1.9287E−03 |
| A8 = | — | — | −4.3541E−05 | −1.2633E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.45 | (R5 − R6)/(R5 + R6) | 0.02 |
| Fno | 2.80 | Rsf/f | 3.28 |
| HFOV [deg.] | 72.0 | f/f3 | 0.05 |
| (V3 + V6)/V5 | 0.73 | f4/f5 | 1.12 |
| CT6/CT3 | 0.11 | f12/f | −1.41 |
| CT3/CTmin | 9.31 | (|f1| + |f2| + |f4|)/|f3| | 0.46 |
| CT3/CTmax | 1.00 | ff/fr | −1.04 |
| CTPmin/CTPmax | 1.99 | f/TL | 0.11 |
| R6/CT3 | 2.03 | | |

5th Embodiment

Figure 9:
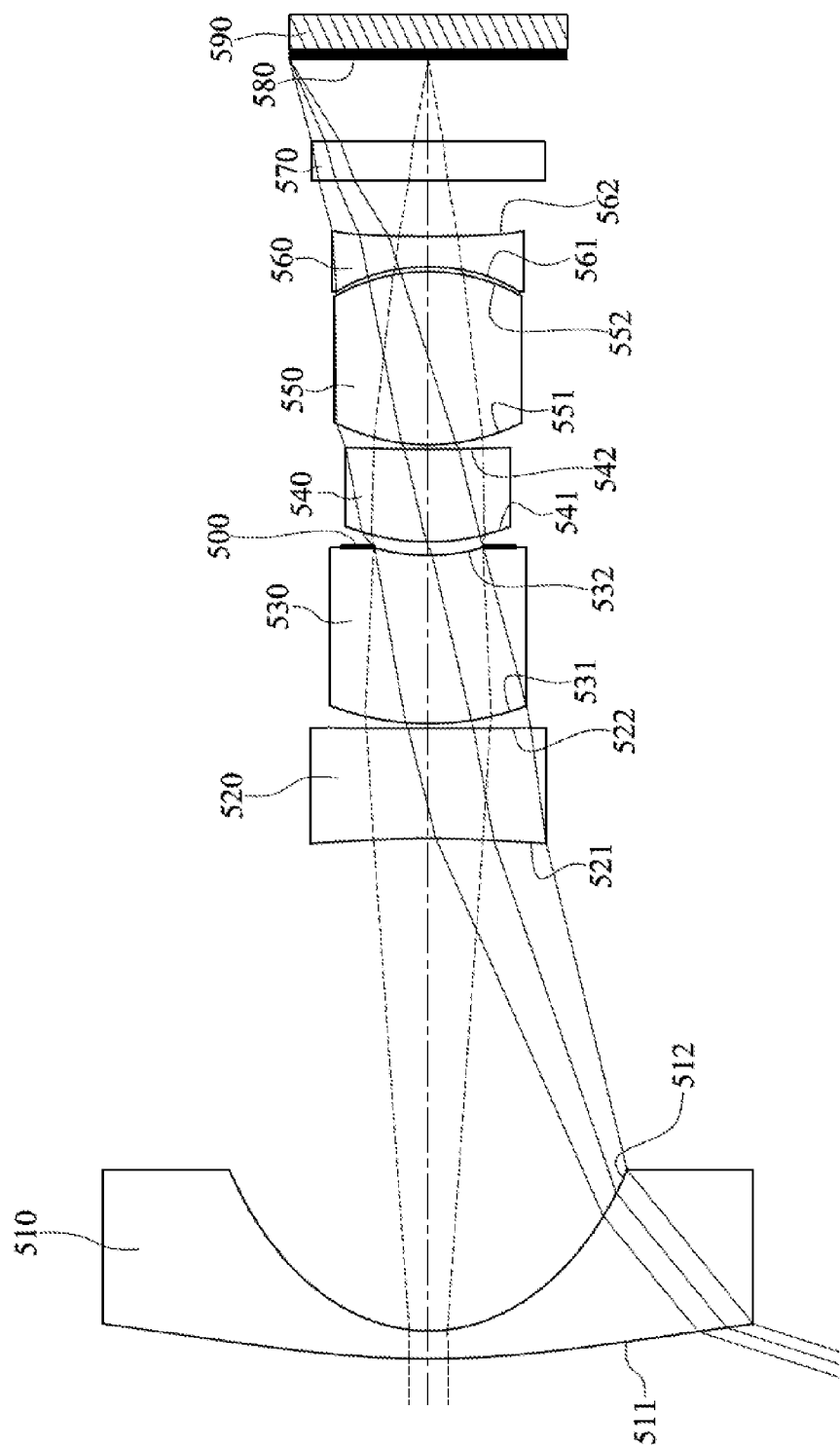
FIG. 9 is a schematic view of an image capturing unit according to the 5th embodiment of the present disclosure.
Figure 10:
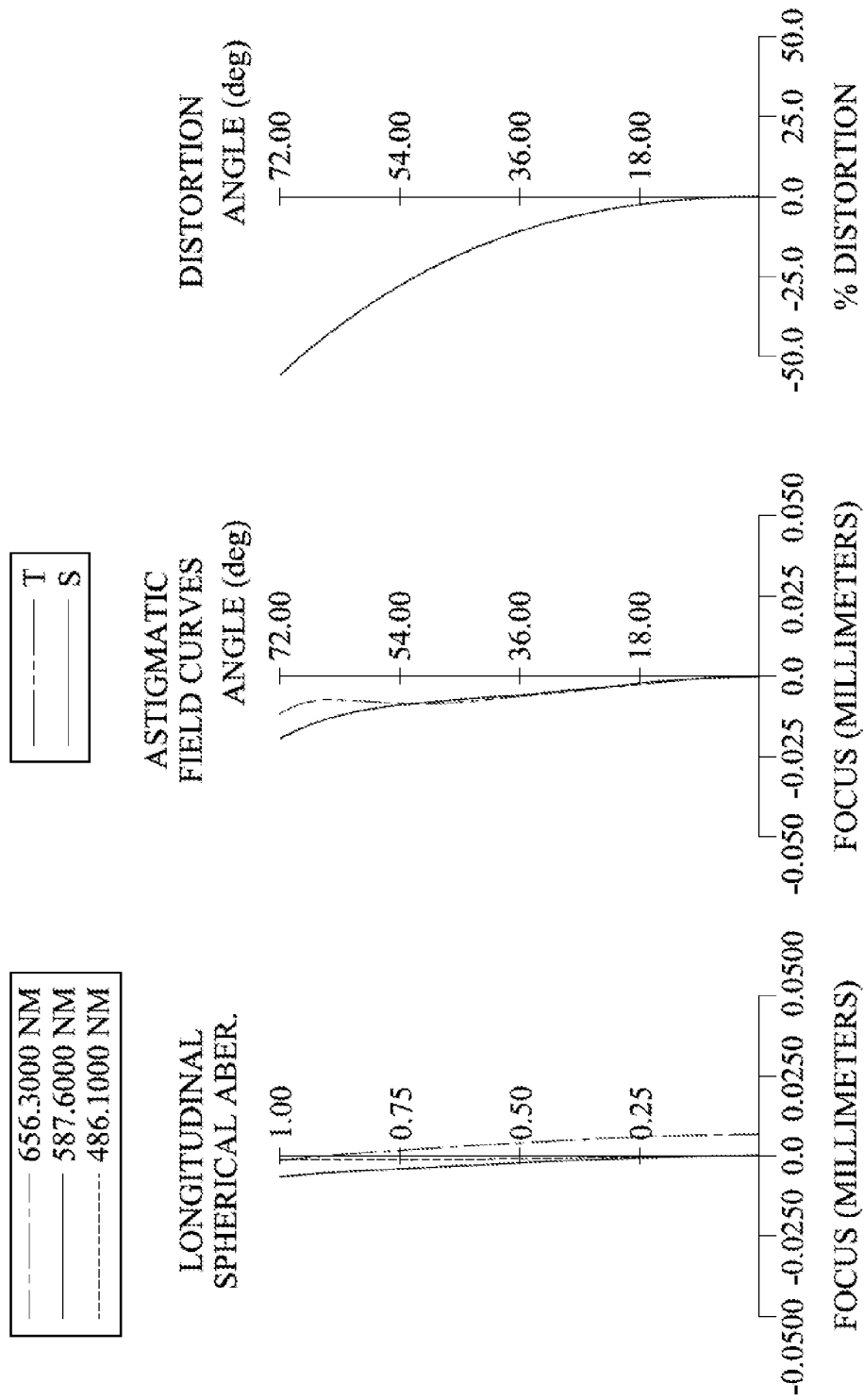
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, a first lens element 510, a second lens element 520, a third lens element 530, an aperture stop 500, a fourth lens element 540, a fifth lens element 550, a sixth lens element 560, an IR-cut filter 570 and an image surface 580, wherein the photographing optical lens assembly has a total of six lens elements (510-560). A front lens group of the photographing optical lens assembly includes the first lens element 510, the second lens element 520 and the third lens element 530, and a rear lens group of the photographing optical lens assembly includes the fourth lens element 540, the fifth lens element 550 and the sixth lens element 560.

The first lens element 510 with negative refractive power has an object-side surface being 511 convex and an image-side surface 512 being concave. The first lens element 510 is made of glass material and has the object-side surface 511 and the image-side surface 512 being both aspheric.

The second lens element 520 with negative refractive power has an object-side surface 521 being concave and an image-side surface 522 being convex. The second lens element 520 is made of plastic material and has the object-side surface 521 and the image-side surface 522 being both aspheric.

The third lens element 530 with negative refractive power has an object-side surface 531 being convex and an image-side surface 532 being concave. The third lens element 530 is made of glass material and has the object-side surface 531 and the image-side surface 532 being both spherical.

The fourth lens element 540 with positive refractive power has an object-side surface 541 being convex and an image-side surface 542 being concave. The fourth lens element 540 is made of glass material and has the object-side surface 541 and the image-side surface 542 being both spherical The fifth lens element 550 with positive refractive power has an object-side surface 551 being convex and an image-side surface 552 being convex. The fifth lens element 550 is made of glass material and has the object-side surface 551 and the image-side surface 552 being both spherical.

The sixth lens element 560 with negative refractive power has an object-side surface 561 being concave and an image-side surface 562 being concave. The sixth lens element 560 is made of plastic material and has the object-side surface 561 and the image-side surface 562 being both aspheric.

The IR-cut filter 570 is made of glass material and located between the sixth lens element 560 and the image surface 580, and will not affect the focal length of the photographing optical lens assembly. The image sensor 590 is disposed on or near the image surface 580 of the photographing optical lens assembly.

In this embodiment, an axial distance between the first lens element 510 and the second lens element 520 is the largest among all axial distances between every two lens elements of the photographing optical lens assembly that are adjacent to each other.

The detailed optical data of the 5th embodiment are shown in Table 9 and the aspheric surface data are shown in Table 10 below.

TABLE 9

5th Embodiment
f = 2.34 mm, Fno = 2.80, HFOV = 72.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 19.818 (ASP) | 0.600 | Glass | 1.729 | 54.5 | −5.84 |
| 2 | | 3.460 (ASP) | 10.621 | | | | |

TABLE 9-continued

5th Embodiment
f = 2.34 mm, Fno = 2.80, HFOV = 72.0 deg.

| Surface # | | Curvature Radius | Thickness | Material | Index | Abbe # | Focal Length |
|---|---|---|---|---|---|---|---|
| 3 | Lens 2 | −20.274 (ASP) | 2.373 | Plastic | 1.634 | 23.8 | −38.89 |
| 4 | | −119.178 (ASP) | 0.100 | | | | |
| 5 | Lens 3 | 5.975 | 3.623 | Glass | 1.847 | 23.8 | −337.59 |
| 6 | | 4.225 | 0.188 | | | | |
| 7 | Ape. Stop | Plano | 0.100 | | | | |
| 8 | Lens 4 | 4.867 | 2.004 | Glass | 1.754 | 52.3 | 7.06 |
| 9 | | 47.132 | 0.100 | | | | |
| 10 | Lens 5 | 4.509 | 3.728 | Glass | 1.620 | 60.3 | 4.13 |
| 11 | | −4.065 | 0.105 | | | | |
| 12 | Lens 6 | −4.660 (ASP) | 0.657 | Plastic | 1.660 | 20.4 | −5.89 |
| 13 | | 24.724 (ASP) | 1.198 | | | | |
| 14 | IR-cut filter | Plano | 0.850 | Glass | 1.517 | 64.2 | — |
| 15 | | Plano | 1.758 | | | | |
| 16 | Image | Plano | — | | | | |

Note:
Reference wavelength is 587.6 nm (d-line).

TABLE 10

Aspheric Coefficients

| Surface # | | | |
|---|---|---|---|
| | 1 | 2 | 3 |
| k = | −2.0000E+01 | −5.4472E−01 | −2.1422E+00 |
| A4 = | −7.0923E−05 | 3.8703E−05 | 1.1893E−03 |
| A6 = | 4.2746E−07 | 4.0392E−06 | 2.5436E−05 |
| A8 = | — | — | −8.0168E−07 |

| Surface # | | | |
|---|---|---|---|
| | 4 | 12 | 13 |
| k = | 1.0000E+01 | 2.4097E+00 | −2.0000E+01 |
| A4 = | 1.3894E−03 | −6.6717E−03 | −3.0151E−03 |
| A6 = | 4.0834E−05 | 1.3094E−03 | 1.3599E−03 |
| A8 = | −9.1947E−07 | — | −3.8791E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.34 | (R5 − R6)/(R5 + R6) | 0.17 |
| Fno | 2.80 | Rsf/f | 1.81 |
| HFOV [deg.] | 72.0 | f/f3 | −0.01 |
| (V3 + V6)/V5 | 0.73 | f4/f5 | 1.71 |
| CT6/CT3 | 0.18 | f12/f | −1.77 |
| CT3/CTmin | 6.04 | (|f1| + |f2| + |f4|)/|f3| | 0.15 |
| CT3/CTmax | 0.97 | ff/fr | −0.74 |
| CTPmin/CTPmax | 0.97 | f/TL | 0.08 |
| R6/CT3 | 1.17 | | |

6th Embodiment

Figure 11:
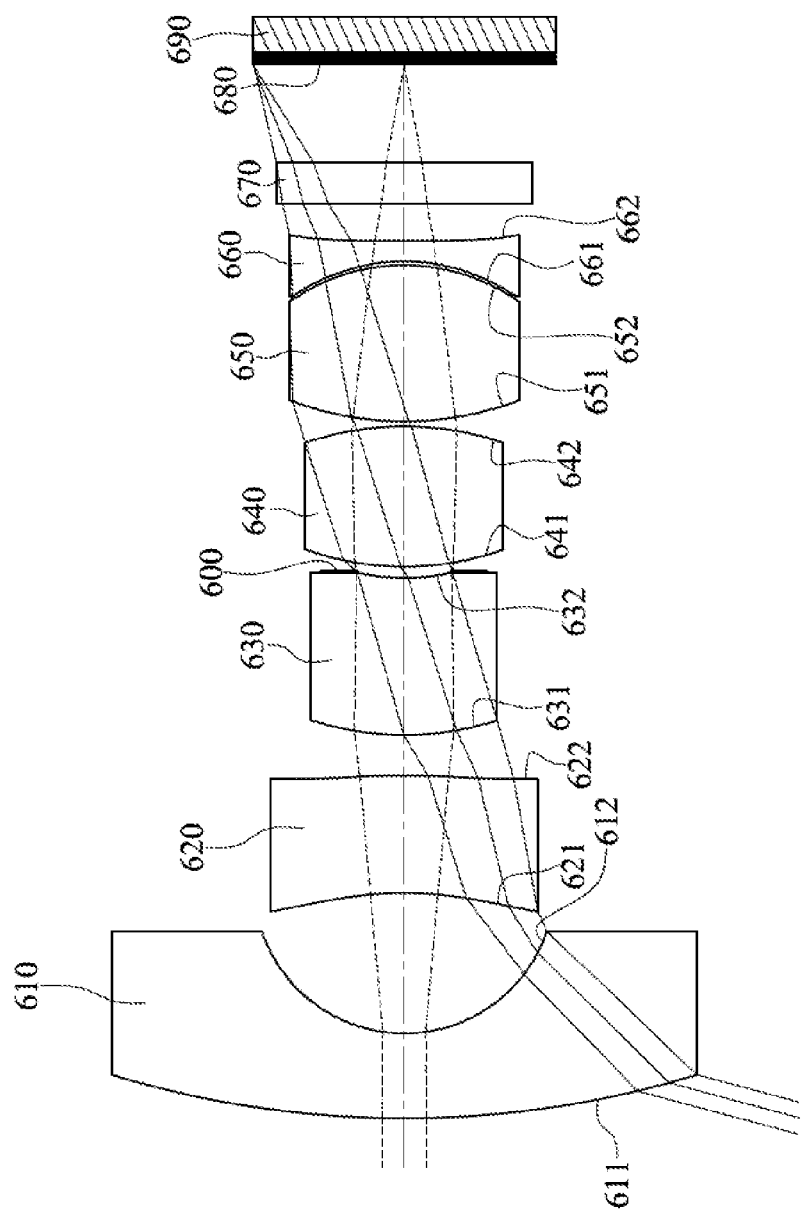
FIG. 11 is a schematic view of an image capturing unit according to the 6th embodiment of the present disclosure.
Figure 12:
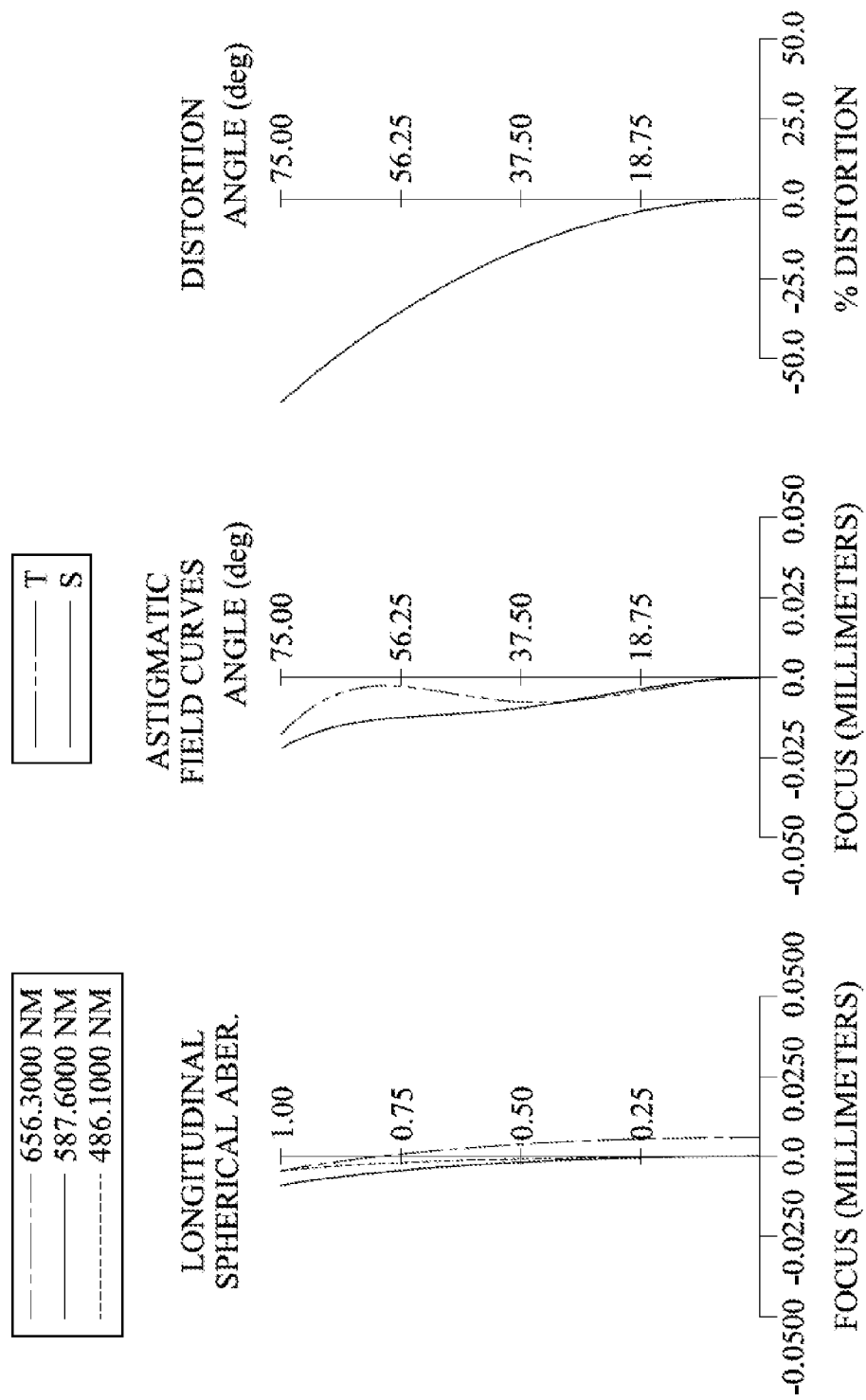
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, a second lens element 620, a third lens element 630, an aperture stop 600, a fourth lens element 640, a fifth lens element 650, a sixth lens element 660, an IR-cut filter 670 and an image surface 680, wherein the photographing optical lens assembly has a total of six lens elements (610-660). A front lens group of the photographing optical lens assembly includes the first lens element 610, the second lens element 620 and the third lens element 630, and a rear lens group of the photographing optical lens assembly includes the fourth lens element 640, the fifth lens element 650 and the sixth lens element 660.

The first lens element 610 with negative refractive power has an object-side surface 611 being convex and an image-side surface 612 being concave. The first lens element 610 is made of glass material and has the object-side surface 611 and the image-side surface 612 being both spherical.

The second lens element 620 with negative refractive power has an object-side surface 621 being concave and an image-side surface 622 being convex. The second lens element 620 is made of plastic material and has the object-side surface 621 and the image-side surface 622 being both aspheric.

The third lens element 630 with negative refractive power has an object-side surface 631 being convex and an image-side surface 632 being concave. The third lens element 630 is made of glass material and has the object-side surface 631 and the image-side surface 632 being both spherical.

The fourth lens element 640 with positive refractive power has an object-side surface 641 being convex and an image-side surface 642 being convex. The fourth lens element 640 is made of glass material and has the object-side surface 641 and the image-side surface 642 being both spherical.

The fifth lens element 650 with positive refractive power has an object-side surface 651 being convex and an image-side surface 652 being convex. The fifth lens element 650 is made of glass material and has the object-side surface 651 and the image-side surface 652 being both spherical.

The sixth lens element 660 with negative refractive power has an object-side surface 661 being concave and an image-side surface 662 being concave. The sixth lens element 660 is made of plastic material and has the object-side surface 661 and the image-side surface 662 being both aspheric.

The IR-cut filter 670 is made of glass material and located between the sixth lens element 660 and the image surface 680, and will not affect the focal length of the photographing optical lens assembly. The image sensor 690 is disposed on or near the image surface 680 of the photographing optical lens assembly.

In this embodiment, an axial distance between the first lens element 610 and the second lens element 620 is the largest among all axial distances between every two lens elements of the photographing optical lens assembly that are adjacent to each other.

The detailed optical data of the 6th embodiment are shown in Table 11 and the aspheric surface data are shown in Table 12 below.

TABLE 11

6th Embodiment
f = 2.54 mm, Fno = 2.80, HFOV = 75.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 20.529 | 1.735 | Glass | 1.729 | 54.5 | −5.18 |
| 2 | | 3.075 | 2.869 | | | | |
| 3 | Lens 2 | −7.179 (ASP) | 2.400 | Plastic | 1.634 | 23.8 | −22.93 |
| 4 | | −16.024 (ASP) | 0.831 | | | | |
| 5 | Lens 3 | 6.170 | 3.213 | Glass | 1.847 | 23.8 | −119.19 |
| 6 | | 4.426 | 0.125 | | | | |
| 7 | Ape. Stop | Plano | 0.100 | | | | |
| 8 | Lens 4 | 6.005 | 2.868 | Glass | 1.754 | 52.3 | 4.52 |
| 9 | | −6.250 | 0.100 | | | | |
| 10 | Lens 5 | 6.582 | 3.198 | Glass | 1.620 | 60.3 | 4.56 |
| 11 | | −4.037 | 0.080 | | | | |
| 12 | Lens 6 | −3.776 (ASP) | 0.420 | Plastic | 1.660 | 20.4 | −5.61 |
| 13 | | 192.059 (ASP) | 0.758 | | | | |
| 14 | IR-cut filter | Plano | 0.850 | Glass | 1.517 | 64.2 | — |
| 15 | | Plano | 2.002 | | | | |
| 16 | Image | Plano | — | | | | |

Note:
Reference wavelength is 587.6 nm (d-line).

TABLE 12

Aspheric Coefficients

| | Surface # | | | |
|---|---|---|---|---|
| | 3 | 4 | 12 | 13 |
| k = | −6.3753E+00 | −2.8030E+00 | 6.3102E−01 | 2.0000E+01 |
| A4 = | 6.7133E−04 | 3.1591E−03 | 3.2602E−03 | 2.2761E−03 |
| A6 = | 8.3370E−05 | 9.5600E−05 | 2.4882E−04 | 2.6539E−04 |
| A8 = | −2.3139E−06 | −3.2671E−06 | — | −6.9401E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.54 | (R5 − R6)/(R5 + R6) | 0.16 |
| Fno | 2.80 | Rsf/f | 1.74 |
| HFOV [deg.] | 75.0 | f/f3 | −0.02 |
| (V3 + V6)/V5 | 0.73 | f4/f5 | 0.99 |
| CT6/CT3 | 0.13 | f12/f | −1.59 |
| CT3/CTmin | 7.65 | (|f1| + |f2| + |f4|)/|f3| | 0.27 |
| CT3/CTmax | 1.00 | ff/fr | −0.84 |
| CTPmin/CTPmax | 1.12 | f/TL | 0.12 |
| R6/CT3 | 1.38 | | |

7th Embodiment

Figure 13:
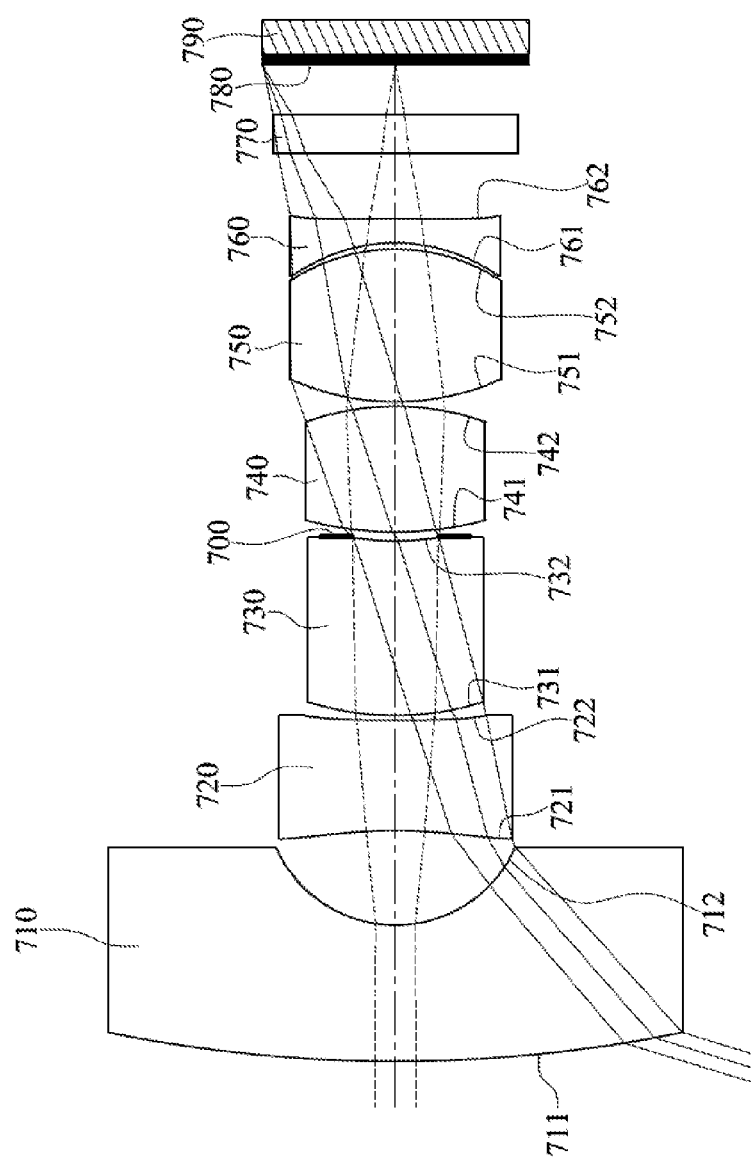
FIG. 13 a schematic view of an image capturing unit according to the 7th embodiment of the present disclosure.
Figure 14:
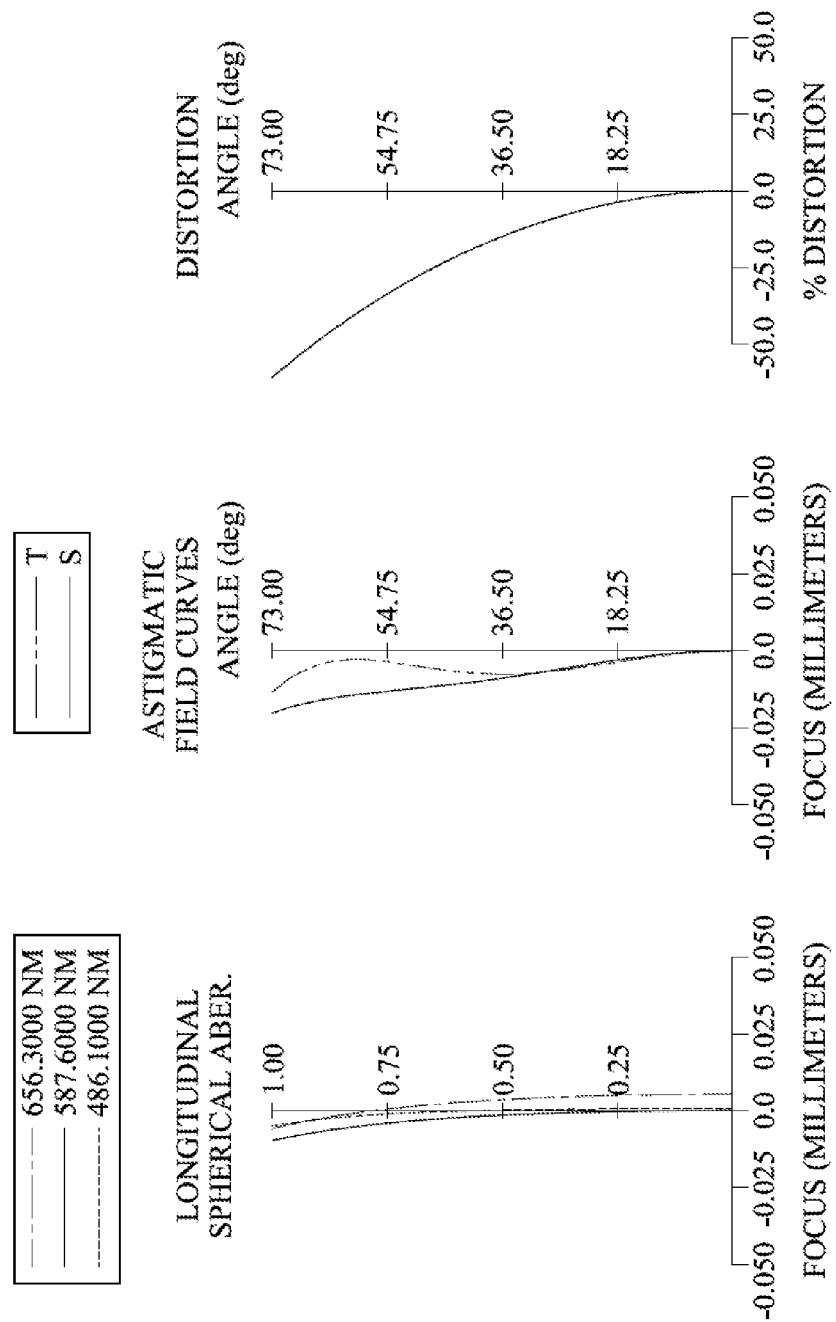
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, a first lens element 710, a second lens element 720, a third lens element 730, an aperture stop 700, a fourth lens element 740, a fifth lens element 750, a sixth lens element 760, an IR-cut filter 770 and an image surface 780, wherein the photographing optical lens assembly has a total of six lens elements (710-760). A front lens group of the photographing optical lens assembly includes the first lens element 710, the second lens element 720 and the third lens element 730, and a rear lens group of the photographing optical lens assembly includes the fourth lens element 740, the fifth lens element 750 and the sixth lens element 760.

The first lens element 710 with negative refractive power has an object-side surface 711 being convex and an image-side surface 712 being concave. The first lens element 710 is made of glass material and has the object-side surface 711 and the image-side surface 712 being both spherical.

The second lens element 720 with negative refractive power has an object-side surface 721 being concave and an image-side surface 722 being concave. The second lens element 720 is made of plastic material and has the object-side surface 721 and the image-side surface 722 being both aspheric.

The third lens element 730 with positive refractive power has an object-side surface 731 being convex and an image-side surface 732 being concave. The third lens element 730 is made of glass material and has the object-side surface 731 and the image-side surface 732 being both spherical.

The fourth lens element 740 with positive refractive power has an object-side surface 741 being convex and an image-side surface 742 being convex. The fourth lens element 740 is made of glass material and has the object-side surface 741 and the image-side surface 742 being both spherical.

The fifth lens element 750 with positive refractive power has an object-side surface 751 being convex and an image-side surface 752 being convex. The fifth lens element 750 is made of glass material and has the object-side surface 751 and the image-side surface 752 being both spherical.

The sixth lens element 760 with negative refractive power has an object-side surface 761 being concave and an image-side surface 762 being convex. The sixth lens element 760 is made of plastic material and has the object-side surface 761 and the image-side surface 762 being both aspheric.

The IR-cut filter 770 is made of glass material and located between the sixth lens element 760 and the image surface 780, and will not affect the focal length of the photographing optical lens assembly. The image sensor 790 is disposed on or near the image surface 780 of the photographing optical lens assembly.

In this embodiment, an axial distance between the first lens element 710 and the second lens element 720 is the largest among all axial distances between every two lens elements of the photographing optical lens assembly that are adjacent to each other.

The detailed optical data of the 7th embodiment are shown in Table 13 and the aspheric surface data are shown in Table 14 below.

TABLE 14

Aspheric Coefficients

| Surface # | | | |
|---|---|---|---|
| 3 | 4 | 12 | 13 |
| k = −6.3241E+00 | −3.9707E+01 | 5.5320E−01 | 2.0000E+01 |
| A4 = 2.9288E−03 | 4.8386E−03 | 1.7532E−03 | 1.6792E−03 |
| A6 = −8.0679E−05 | 8.6391E−05 | 4.1509E−04 | 4.0017E−04 |
| A8 = 6.7997E−06 | −6.7950E−06 | — | −8.2550E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.46 | (R5 − R6)/(R5 + R6) | 0.02 |
| Fno | 2.75 | Rsf/f | 2.41 |
| HFOV [deg.] | 73.0 | f/f3 | 0.08 |
| (V3 + V6)/V5 | 0.73 | f4/f5 | 1.07 |
| CT6/CT3 | 0.14 | f12/f | −1.25 |
| CT3/CTmin | 7.31 | (|f1| + |f2| + |f4|)/|f3| | 0.77 |
| CT3/CTmax | 1.00 | ff/fr | −0.86 |
| CTPmin/CTPmax | 1.14 | f/TL | 0.11 |
| R6/CT3 | 1.56 | | |

8th Embodiment

Figure 15:
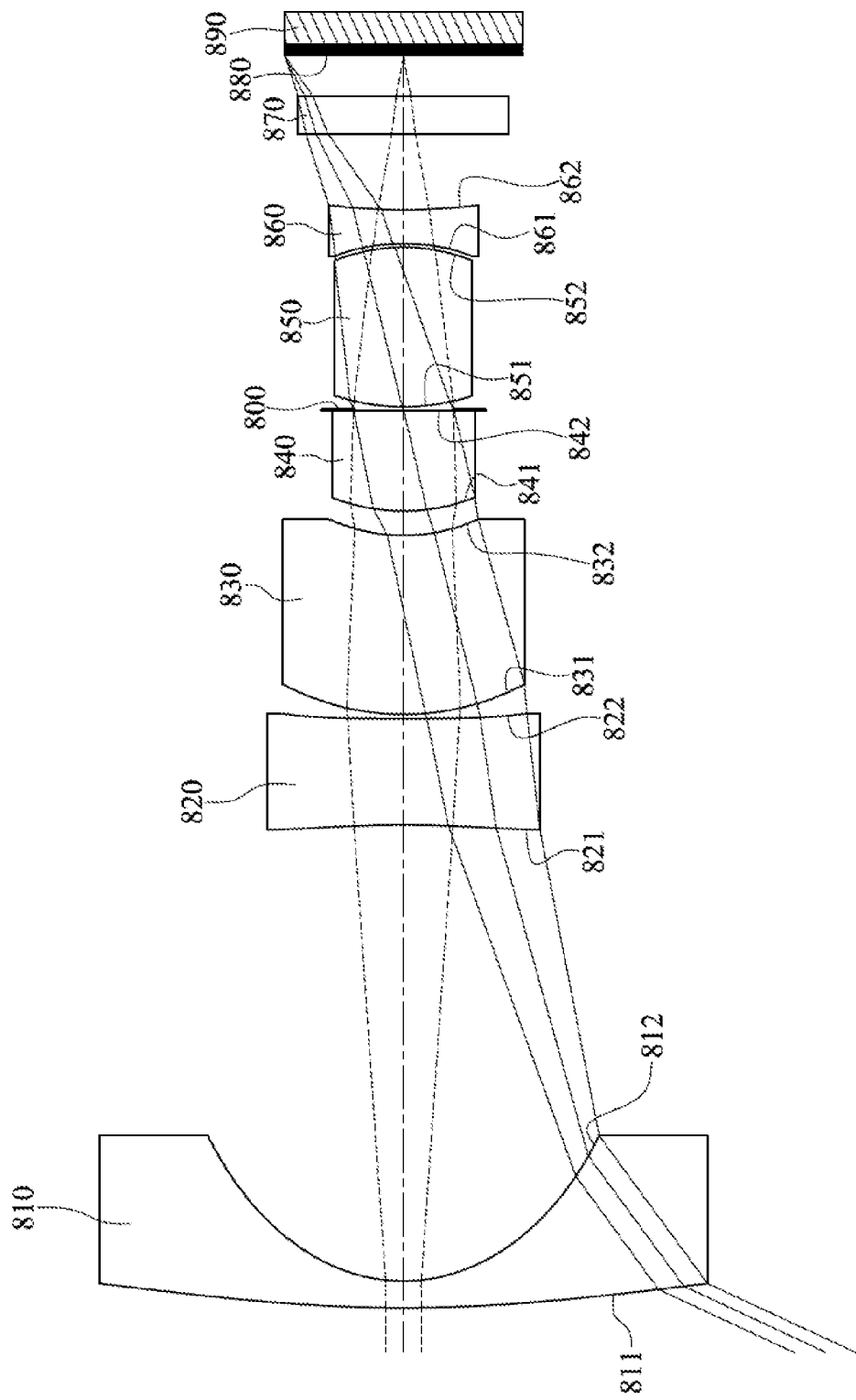
FIG. 15 a schematic view of an image capturing unit according to the 8th embodiment of the present disclosure.

FIG. 15 is a schematic view of an image capturing unit according to the 8th embodiment of the present disclosure.

TABLE 13

7th Embodiment
f = 2.46 mm, Fno = 2.75, HFOV = 73.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 31.276 | 2.957 | Glass | 1.729 | 54.5 | −4.49 |
| 2 | | 2.844 | 2.060 | | | | |
| 3 | Lens 2 | −10.186 (ASP) | 2.400 | Plastic | 1.634 | 23.8 | −14.07 |
| 4 | | 78.493 (ASP) | 0.100 | | | | |
| 5 | Lens 3 | 6.214 | 3.800 | Glass | 1.847 | 23.8 | 30.06 |
| 6 | | 5.916 | 0.094 | | | | |
| 7 | Ape. Stop | Plano | 0.100 | | | | |
| 8 | Lens 4 | 7.512 | 2.728 | Glass | 1.754 | 52.3 | 4.72 |
| 9 | | −5.716 | 0.100 | | | | |
| 10 | Lens 5 | 5.536 | 3.319 | Glass | 1.620 | 60.3 | 4.40 |
| 11 | | −4.158 | 0.140 | | | | |
| 12 | Lens 6 | −3.721 (ASP) | 0.520 | Plastic | 1.660 | 20.4 | −5.89 |
| 13 | | −92.234 (ASP) | 1.430 | | | | |
| 14 | IR-cut filter | Plano | 0.850 | Glass | 1.517 | 64.2 | — |
| 15 | | Plano | 1.069 | | | | |
| 16 | Image | Plano | — | | | | |

Note:
Reference wavelength is 587.6 nm (d-line).

Figure 16:
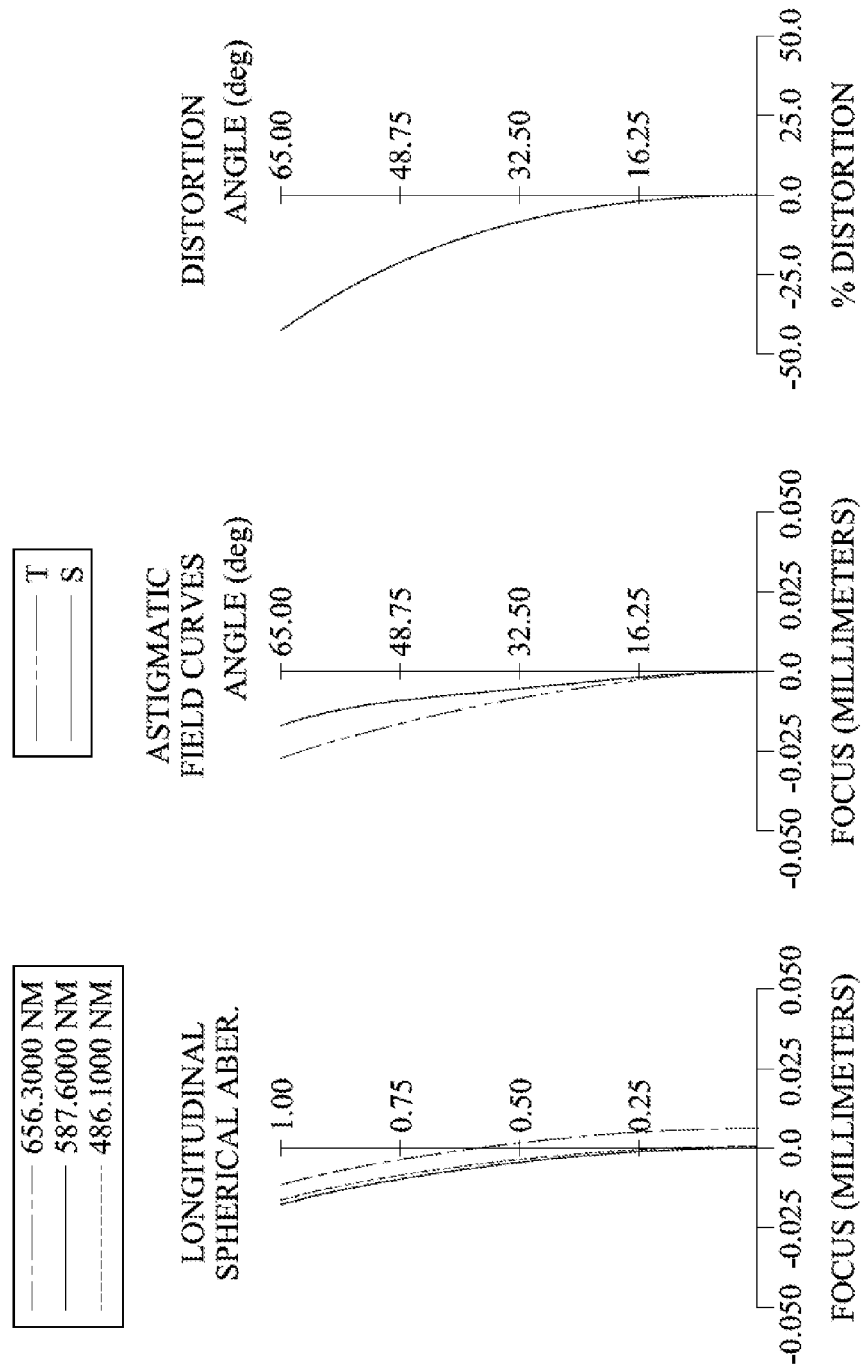
FIG. 16 shows spherical aberration curves, astigmatic field curves and a distortion curve of the image capturing unit according to the 8th embodiment.

FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 890. The photographing optical lens assembly includes, in order from an object side to an image side, a first lens element 810, a second lens element 820, a third lens element 830, a fourth lens element 840, an aperture stop 800, a fifth lens element 850, a sixth lens element 860, an IR-cut filter 870 and an image surface 880, wherein the photographing optical lens assembly has a total of six lens elements (810-860). A front lens group of the photographing optical lens assembly includes the first lens element 810, the second lens element 820, the third lens element 830 and the fourth lens element 840, and a rear lens group of the photographing optical lens assembly includes the fifth lens element 850 and the sixth lens element 860.

The first lens element 810 with negative refractive power has an object-side surface 811 being convex and an image-side surface 812 being concave. The first lens element 810 is made of glass material and has the object-side surface 811 and the image-side surface 812 being both aspheric.

The second lens element 820 with negative refractive power has an object-side surface 821 being concave and an image-side surface 822 being concave. The second lens element 820 is made of plastic material and has the object-side surface 821 and the image-side surface 822 being both aspheric.

The third lens element 830 with positive refractive power has an object-side surface 831 being convex and an image-side surface 832 being concave. The third lens element 830 is made of glass material and has the object-side surface 831 and the image-side surface 832 being both spherical.

The fourth lens element 840 with positive refractive power has an object-side surface 841 being convex and an image-side surface 842 being concave. The fourth lens element 840 is made of glass material and has the object-side surface 841 and the image-side surface 842 being both aspheric.

The fifth lens element 850 with positive refractive power has an object-side surface 851 being convex and an image-side surface 852 being convex. The fifth lens element 850 is made of glass material and has the object-side surface 851 and the image-side surface 852 being both spherical.

The sixth lens element 860 with negative refractive power has an object-side surface 861 being concave and an image-side surface 862 being concave. The sixth lens element 860 is made of plastic material and has the object-side surface 861 and the image-side surface 862 being both aspheric.

The IR-cut filter 870 is made of glass material and located between the sixth lens element 860 and the image surface 880, and will not affect the focal length of the photographing optical lens assembly. The image sensor 890 is disposed on or near the image surface 880 of the photographing optical lens assembly.

In this embodiment, an axial distance between the first lens element 810 and the second lens element 820 is the largest among all axial distances between every two lens elements of the photographing optical lens assembly that are adjacent to each other.

The detailed optical data of the 8th embodiment are shown in Table 15 and the aspheric surface data are shown in Table 16 below.

TABLE 15

8th Embodiment
f = 2.26 mm, Fno = 2.80, HFOV = 65.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 31.963 (ASP) | 0.600 | Glass | 1.729 | 54.5 | −5.86 |
| 2 | | 3.741 (ASP) | 10.203 | | | | |
| 3 | Lens 2 | −25.971 (ASP) | 2.373 | Plastic | 1.634 | 23.8 | −30.38 |
| 4 | | 77.228 (ASP) | 0.100 | | | | |
| 5 | Lens 3 | 5.753 | 4.000 | Glass | 1.847 | 23.8 | 313.25 |
| 6 | | 4.006 | 0.550 | | | | |
| 7 | Lens 4 | 4.360 (ASP) | 2.231 | Glass | 1.754 | 52.3 | 5.84 |
| 8 | | 363.636 (ASP) | 0.030 | | | | |
| 9 | Ape. Stop | Plano | 0.070 | | | | |
| 10 | Lens 5 | 4.953 | 3.564 | Glass | 1.620 | 60.3 | 4.23 |
| 11 | | −4.047 | 0.080 | | | | |
| 12 | Lens 6 | −5.503 (ASP) | 0.760 | Plastic | 1.660 | 20.4 | −5.50 |
| 13 | | 11.224 (ASP) | 1.700 | | | | |
| 14 | IR-cut filter | Plano | 0.850 | Glass | 1.517 | 64.2 | — |
| 15 | | Plano | 0.906 | | | | |
| 16 | Image | Plano | — | | | | |

Note:
Reference wavelength is 587.6 nm (d-line).

TABLE 16

Aspheric Coefficients

| | Surface # | | | |
|---|---|---|---|---|
| | 1 | 2 | 3 | 4 |
| k = | −1.1383E+01 | −5.2071E−01 | −1.6150E+01 | −2.0000E+01 |
| A4 = | −6.7079E−05 | 4.2310E−05 | 4.8297E−04 | 9.9625E−04 |
| A6 = | 3.4287E−07 | 2.3264E−06 | 3.4685E−05 | 4.4260E−05 |
| A8 = | — | — | −1.0111E−06 | −8.9563E−07 |

| | Surface # | | | |
|---|---|---|---|---|
| | 7 | 8 | 12 | 13 |
| k = | −3.4884E−01 | 1.0000E+01 | 4.6965E+00 | −1.0246E+01 |
| A4 = | — | — | −9.8250E−03 | −4.8662E−03 |

TABLE 16-continued

| Aspheric Coefficients | | | | |
|---|---|---|---|---|
| A6 = | — | — | 1.1297E−03 | 1.3558E−03 |
| A8 = | — | — | 7.8480E−05 | −3.8728E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.26 | (R5 − R6)/(R5 + R6) | 0.18 |
| Fno | 2.80 | Rsf/f | 160.77 |
| HFOV [deg.] | 65.0 | f/f3 | 0.01 |
| (V3 + V6)/V5 | 0.73 | f4/f5 | 1.38 |
| CT6/CT3 | 0.19 | f12/f | −1.68 |
| CT3/CTmin | 6.67 | (|f1| + |f2| + |f4|)/|f3| | 0.13 |
| CT3/CTmax | 1.00 | ff/fr | 0.95 |
| CTPmin/CTPmax | 1.12 | f/TL | 0.08 |
| R6/CT3 | 1.00 | | |

9th Embodiment

Figure 17:
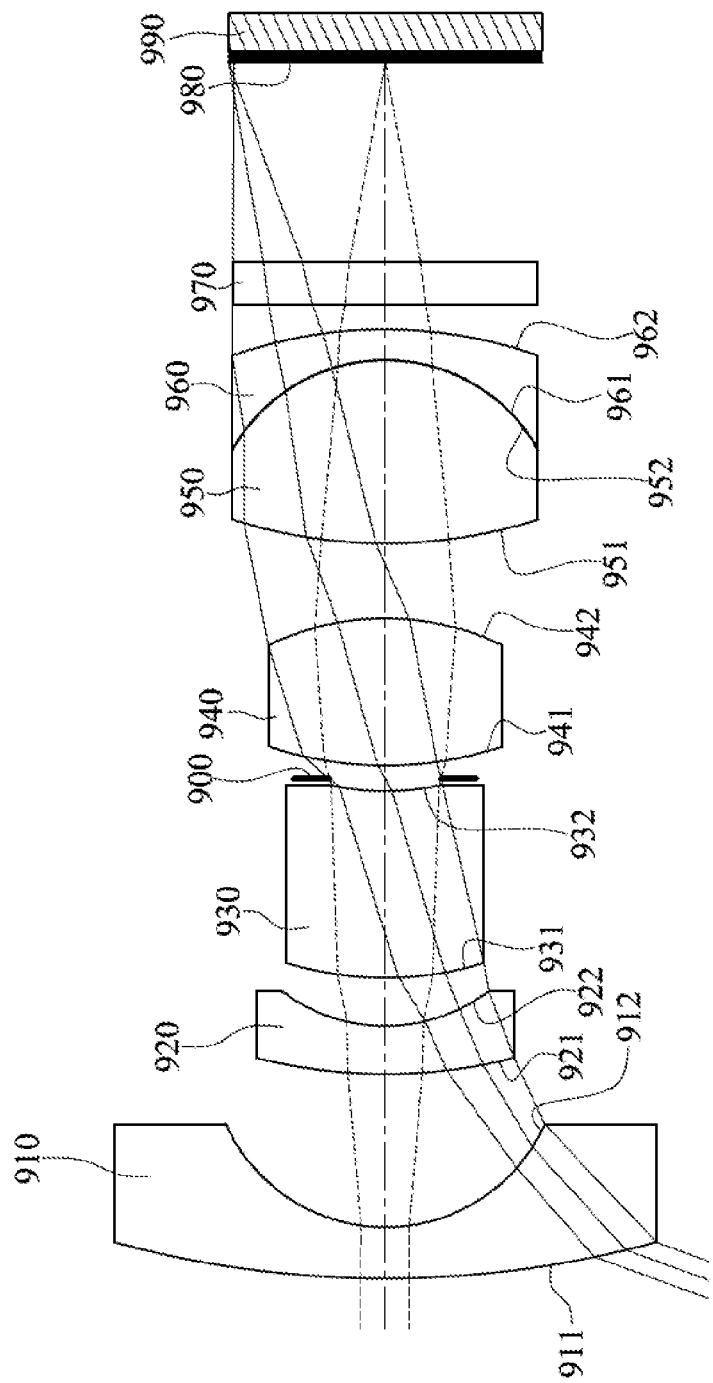
FIG. 17 a schematic view of an image capturing unit according to the 9th embodiment of the present disclosure.
Figure 18:
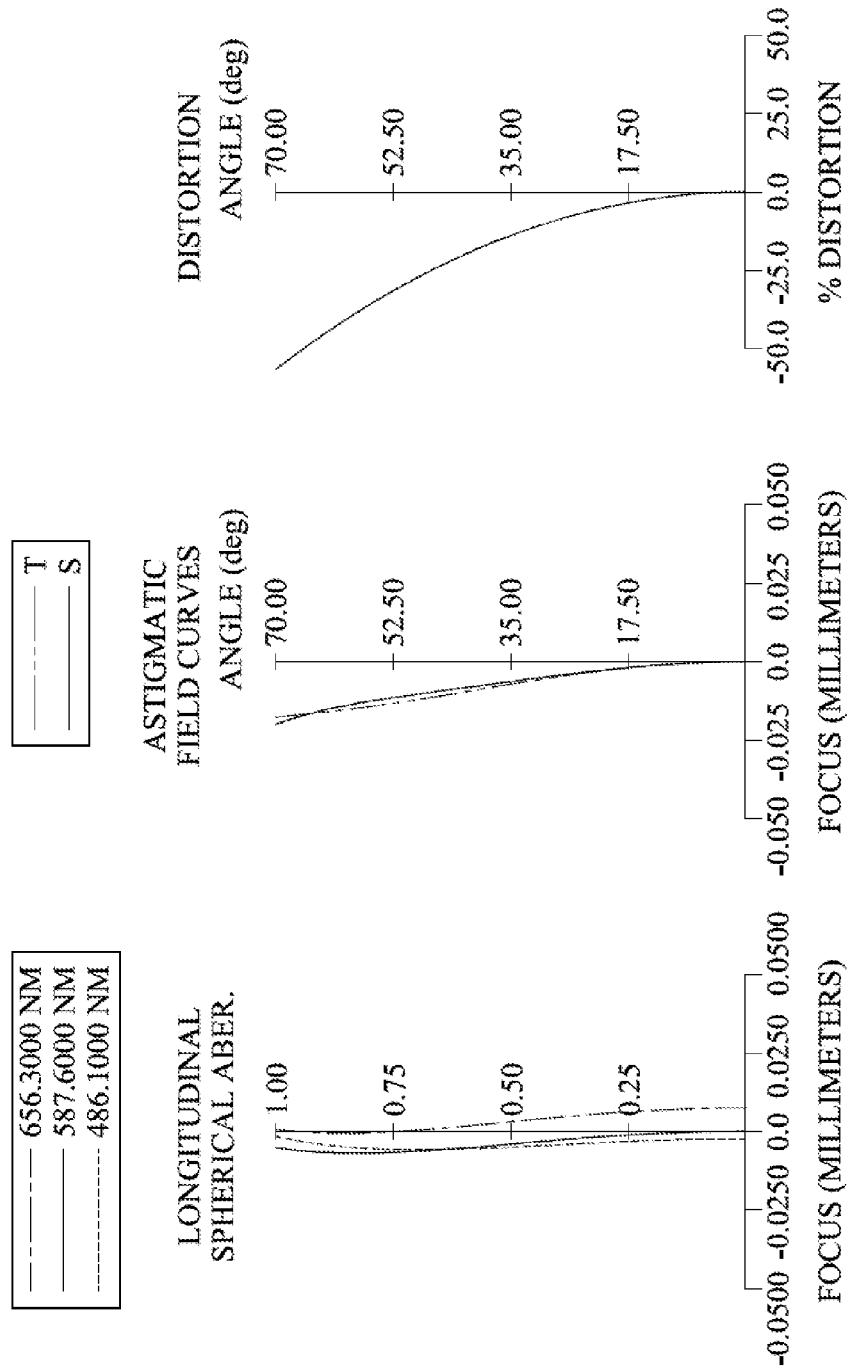
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 990. The photographing optical lens assembly includes, in order from an object side to an image side, a first lens element 910, a second lens element 920, a third lens element 930, an aperture stop 900, a fourth lens element 940, a fifth lens element 950, a sixth lens element 960, an IR-cut filter 970 and an image surface 980, wherein the photographing optical lens assembly has a total of six lens elements (910-960). A front lens group of the photographing optical lens assembly includes the first lens element 910, the second lens element 920 and the third lens element 930, and a rear lens group of the photographing optical lens assembly includes the fourth lens element 940, the fifth lens element 950 and the sixth lens element 960.

The first lens element 910 with negative refractive power has an object-side surface 911 being convex and an image-side surface 912 being concave. The first lens element 910 is made of glass material and has the object-side surface 911 and the image-side surface 912 being both spherical.

The second lens element 920 with negative refractive power has an object-side surface 921 being convex and an image-side surface 922 being concave. The second lens element 920 is made of glass material and has the object-side surface 921 and the image-side surface 922 being both spherical.

The third lens element 930 with negative refractive power has an object-side surface 931 being convex and an image-side surface 932 being concave. The third lens element 930 is made of glass material and has the object-side surface 931 and the image-side surface 932 being both spherical.

The fourth lens element 940 with positive refractive power has an object-side surface 941 being convex and an image-side surface 942 being convex. The fourth lens element 940 is made of glass material and has the object-side surface 941 and the image-side surface 942 being both spherical.

The fifth lens element 950 with positive refractive power has an object-side surface 951 being convex and an image-side surface 952 being convex. The fifth lens element 950 is made of glass material and has the object-side surface 951 and the image-side surface 952 being both spherical.

The sixth lens element 960 with negative refractive power has an object-side surface 961 being concave and an image-side surface 962 being convex. The sixth lens element 960 is made of glass material and has the object-side surface 961 and the image-side surface 962 being both spherical. The image-side surface 952 of the fifth lens element 950 is cemented to the object-side surface 961 of the sixth lens element 960.

The IR-cut filter 970 is made of glass material and located between the sixth lens element 960 and the image surface 980, and will not affect the focal length of the photographing optical lens assembly. The image sensor 990 is disposed on or near the image surface 980 of the photographing optical lens assembly.

In this embodiment, an axial distance between the first lens element 910 and the second lens element 920 is the largest among all axial distances between every two lens elements of the photographing optical lens assembly that are adjacent to each other.

The detailed optical data of the 9th embodiment are shown in Table 17 below.

TABLE 17

9th Embodiment
f = 2.77 mm, Fno = 2.85, HFOV = 70.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 20.353 | 1.010 | Glass | 1.729 | 54.5 | −5.84 |
| 2 | | 3.449 | 3.020 | | | | |
| 3 | Lens 2 | 10.262 | 0.950 | Glass | 1.620 | 60.3 | −8.57 |
| 4 | | 3.377 | 0.952 | | | | |
| 5 | Lens 3 | 6.622 | 3.680 | Glass | 1.847 | 23.8 | −1027.03 |
| 6 | | 4.897 | 0.250 | | | | |
| 7 | Ape. Stop | Plano | 0.260 | | | | |
| 8 | Lens 4 | 7.299 | 2.900 | Glass | 1.754 | 52.3 | 4.51 |

TABLE 17-continued

9th Embodiment
f = 2.77 mm, Fno = 2.85, HFOV = 70.0 deg.

| Surface # | | Curvature Radius | Thickness | Material | Index | Abbe # | Focal Length |
|---|---|---|---|---|---|---|---|
| 9 | | −5.273 | 1.480 | | | | |
| 10 | Lens 5 | 9.892 | 3.610 | Glass | 1.620 | 60.3 | 4.60 |
| 11 | | −3.449 | 0.010 | Cement | 1.514 | 38.8 | |
| 12 | Lens 6 | −3.448 | 0.600 | Glass | 1.847 | 23.8 | −6.91 |
| 13 | | −9.067 | 0.500 | | | | |
| 14 | IR-cut filter | Plano | 0.850 | Glass | 1.517 | 64.2 | — |
| 15 | | Plano | 3.921 | | | | |
| 16 | Image | Plano | — | | | | |

Note:
Reference wavelength is 587.6 nm (d-line).

In the 9th embodiment, the definitions of these parameters shown in the following table are the same as those stated in the 1st embodiment with corresponding values for the 9th embodiment, so an explanation in this regard will not be provided again.

Moreover, these parameters can be calculated from Table 17 as the following values and satisfy the following conditions:

| 9th Embodiment | | | |
|---|---|---|---|
| f [mm] | 2.77 | (R5 − R6)/(R5 + R6) | 0.15 |
| Fno | 2.85 | Rsf/f | 1.77 |
| HFOV [deg.] | 70.0 | f/f3 | −0.003 |
| (V3 + V6)/V5 | 0.79 | f4/f5 | 0.98 |
| CT6/CT3 | 0.16 | f12/f | −0.99 |
| CT3/CTmin | 6.13 | (|f1| + |f2| + |f4|)/|f3| | 0.02 |
| CT3/CTmax | 1.00 | ff/fr | −0.50 |
| CTPmin/CTPmax | 1.27 | f/TL | 0.12 |
| R6/CT3 | 1.33 | | |

10th Embodiment

Figure 19:
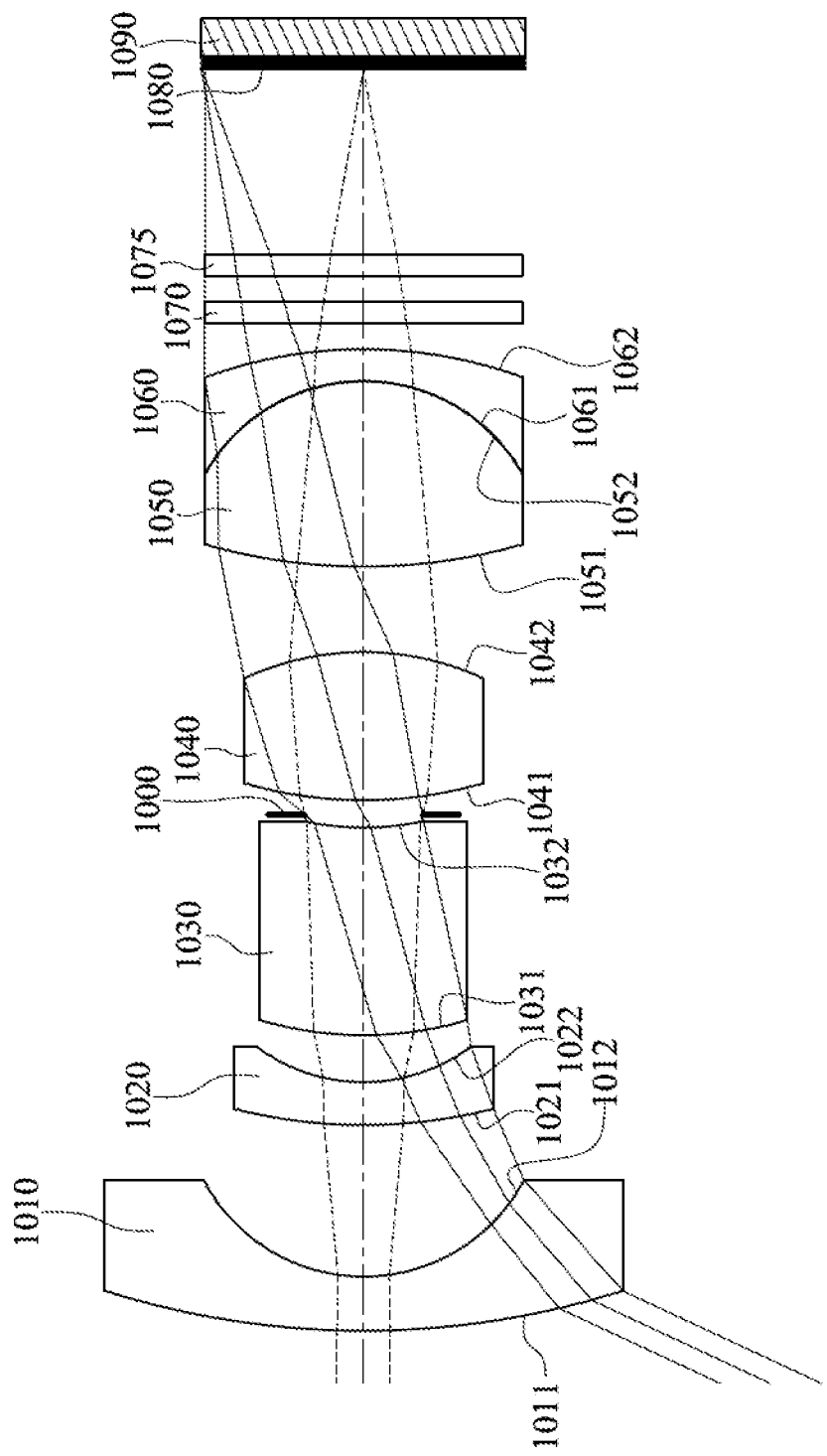
FIG. 19 a schematic view of an image capturing unit according to the 10th embodiment of the present disclosure.
Figure 20:
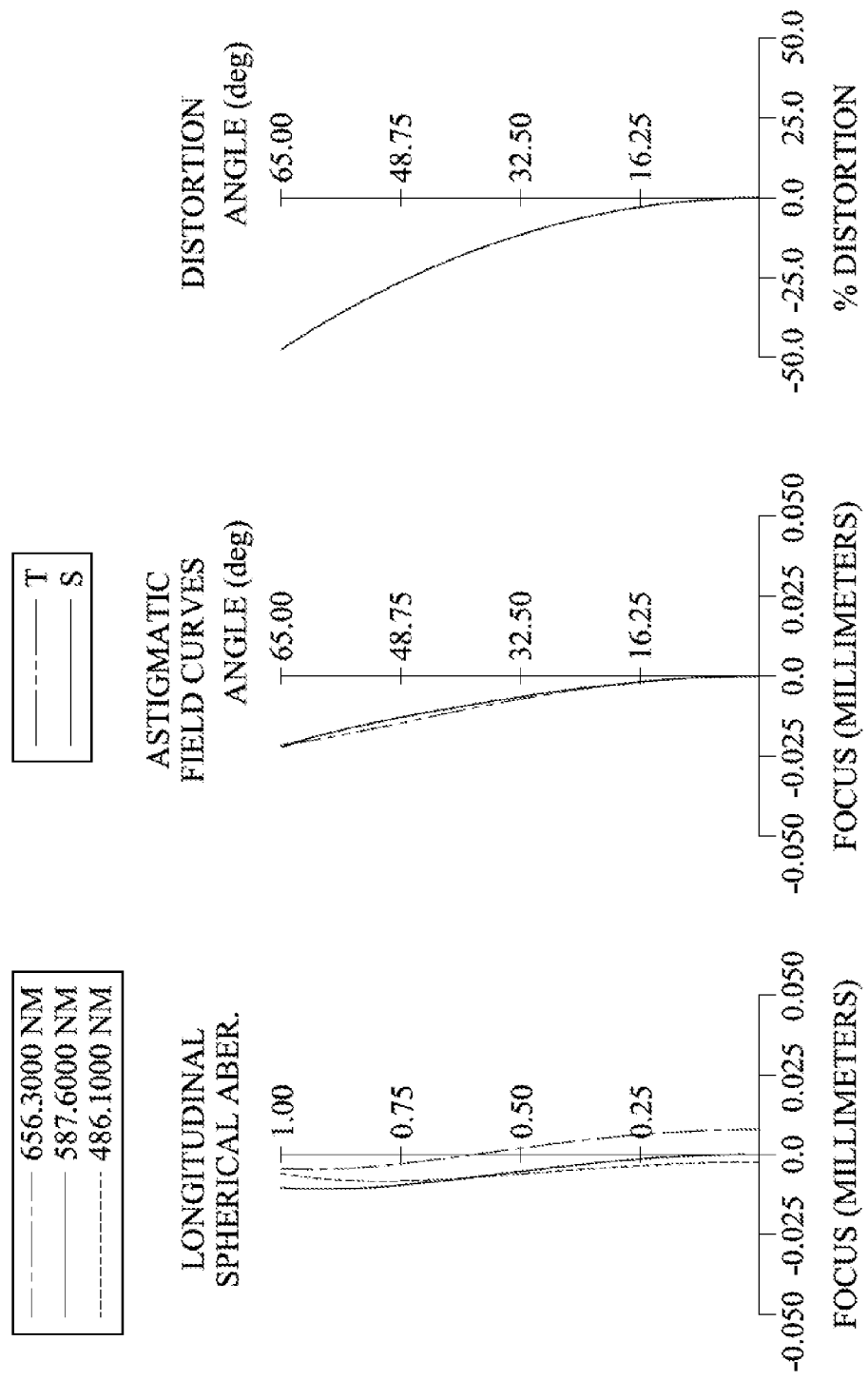
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens assembly (its reference numeral is omitted) of the present disclosure and an image sensor 1090. The photographing optical lens assembly includes, in order from an object side to an image side, a first lens element 1010, a second lens element 1020, a third lens element 1030, an aperture stop 1000, a fourth lens element 1040, a fifth lens element 1050, a sixth lens element 1060, an IR-cut filter 1070, a cover glass 1075 and an image surface 1080, wherein the photographing optical lens assembly has a total of six lens elements (1010-1060). A front lens group of the photographing optical lens assembly includes the first lens element 1010, the second lens element 1020 and the third lens element 1030, and a rear lens group of the photographing optical lens assembly includes the fourth lens element 1040, the fifth lens element 1050 and the sixth lens element 1060.

The first lens element 1010 with negative refractive power has an object-side surface 1011 being convex and an image-side surface 1012 being concave. The first lens element 1010 is made of glass material and has the object-side surface 1011 and the image-side surface 1012 being both spherical.

The second lens element 1020 with negative refractive power has an object-side surface 1021 being convex and an image-side surface 1022 being concave. The second lens element 1020 is made of glass material and has the object-side surface 1021 and the image-side surface 1022 being both spherical.

The third lens element 1030 with positive refractive power has an object-side surface 1031 being convex and an image-side surface 1032 being concave. The third lens element 1030 is made of glass material and has the object-side surface 1031 and the image-side surface 1032 being both spherical.

The fourth lens element 1040 with positive refractive power has an object-side surface 1041 being convex and an image-side surface 1042 being convex. The fourth lens element 1040 is made of glass material and has the object-side surface 1041 and the image-side surface 1042 being both spherical.

The fifth lens element 1050 with positive refractive power has an object-side surface 1051 being convex and an image-side surface 1052 being convex. The fifth lens element 1050 is made of glass material and has the object-side surface 1051 and the image-side surface 1052 being both spherical.

The sixth lens element 1060 with negative refractive power has an object-side surface 1061 being concave and an image-side surface 1062 being convex. The sixth lens element 1060 is made of glass material and has the object-side surface 1061 and the image-side surface 1062 being both spherical. The image-side surface 1052 of the fifth lens element 1050 is cemented to the object-side surface 1061 of the sixth lens element 1060.

The IR-cut filter 1070 and the cover glass 1075 are made of glass material and located between the sixth lens element 1060 and the image surface 1080, and will not affect the focal length of the photographing optical lens assembly. The image sensor 1090 is disposed on or near the image surface 1080 of the photographing optical lens assembly.

In this embodiment, an axial distance between the first lens element 1010 and the second lens element 1020 is the largest among all axial distances between every two lens elements of the photographing optical lens assembly that are adjacent to each other.

The detailed optical data of the 10th embodiment are shown in Table 18 below.

TABLE 18

10th Embodiment
f = 2.88 mm, Fno = 2.85, HFOV = 65.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 16.354 | 1.030 | Glass | 1.800 | 42.2 | −5.66 |
| 2 | | 3.446 | 2.880 | | | | |
| 3 | Lens 2 | 9.988 | 0.820 | Glass | 1.620 | 60.3 | −8.81 |
| 4 | | 3.422 | 0.900 | | | | |
| 5 | Lens 3 | 6.978 | 3.940 | Glass | 1.923 | 18.9 | 165.05 |
| 6 | | 5.332 | 0.250 | | | | |
| 7 | Ape. Stop | Plano | 0.270 | | | | |
| 8 | Lens 4 | 8.101 | 2.820 | Glass | 1.804 | 46.6 | 4.45 |
| 9 | | −5.422 | 1.630 | | | | |
| 10 | Lens 5 | 10.975 | 3.520 | Glass | 1.620 | 60.3 | 4.68 |
| 11 | | −3.462 | 0.010 | Cement | 1.514 | 38.8 | |
| 12 | Lens 6 | −3.461 | 0.600 | Glass | 1.847 | 23.8 | −7.11 |
| 13 | | −8.798 | 0.500 | | | | |
| 14 | IR-cut filter | Plano | 0.400 | Glass | 1.517 | 64.2 | — |
| 15 | | Plano | 0.500 | | | | |
| 16 | Cover glass | Plano | 0.400 | Glass | 1.517 | 64.2 | — |
| 17 | | Plano | 3.530 | | | | |
| 18 | Image | Plano | — | | | | |

Note:
Reference wavelength is 587.6 nm (d-line).

In the 10th embodiment, the definitions of these parameters shown in the following table are the same as those stated in the 1st embodiment with corresponding values for the 10th embodiment, so an explanation in this regard will not be provided again.

Moreover, these parameters can be calculated from Table 18 as the following values and satisfy the following conditions:

| 10th Embodiment | | | |
|---|---|---|---|
| f [mm] | 2.88 | (R5 − R6)/(R5 + R6) | 0.13 |
| Fno | 2.85 | Rsf/f | 1.85 |
| HFOV [deg.] | 65.0 | f/f3 | 0.02 |
| (V3 + V6)/V5 | 0.71 | f4/f5 | 0.95 |
| CT6/CT3 | 0.15 | f12/f | −0.96 |
| CT3/CTmin | 6.57 | (|f1| + |f2| + |f4|)/|f3| | 0.11 |
| CT3/CTmax | 1.00 | ff/fr | −0.51 |
| CTPmin/CTPmax | 1.40 | f/TL | 0.12 |
| R6/CT3 | 1.35 | | |

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
  a first lens element having negative refractive power;
  a second lens element having negative refractive power;
  a third lens element;
  a fourth lens element having positive refractive power;
  a fifth lens element having positive refractive power; and
  a sixth lens element having negative refractive power;
  wherein an absolute value of a focal length of the second lens element is larger than an absolute value of a focal length of the sixth lens element;
  wherein the photographing optical lens assembly has a total of six lens elements, the photographing optical lens assembly further comprises an aperture stop; a focal length of the first lens element is f1, a focal length of the second lens element is f2, a focal length of the third lens element is f3, a central thickness of the third lens element is CT3, a central thickness of the sixth lens element is CT6, a curvature radius of a surface closest to the aperture stop among all surfaces of at least one of the lens elements of the photographing optical lens assembly located between the imaged object and the aperture stop is Rsf, a focal length of the photographing optical lens assembly is f, a minimum central thickness among central thicknesses of all lens elements of the photographing optical lens assembly is CTmin, and the following conditions are satisfied:

$|f1|<|f2|<|f3|;$ $0<CT6/CT3<0.80;$ $4.0<CT3/CTmin \leq 7.65;$ and $-1.5<Rsf/f.$ 2. The photographing optical lens assembly of claim 1, wherein the third lens element has an image-side surface being concave.

3. The photographing optical lens assembly of claim 1, wherein the third lens element has negative refractive power.

4. The photographing optical lens assembly of claim 1, wherein the aperture stop is disposed between the third lens element and the fourth lens element.

5. The photographing optical lens assembly of claim 1, wherein the curvature radius of the surface closest to the aperture stop among all surfaces of the at least one of the lens elements of the photographing optical lens assembly located between the imaged object and the aperture stop is Rsf, the focal length of the photographing optical lens assembly is f, and the following condition is satisfied:

$0<Rsf/f$.

6. The photographing optical lens assembly of claim 1, wherein a curvature radius of an object-side surface of the third lens element is R5, a curvature radius of an image-side surface of the third lens element is R6, and the following condition is satisfied:

$-0.20<(R5-R6)/(R5+R6)<0.35$.

7. The photographing optical lens assembly of claim 1, wherein a central thickness of the lens element having the strongest refractive power among all lens elements of the photographing optical lens assembly is CTPmax, a central thickness of the lens element having the weakest refractive power among all lens elements of the photographing optical lens assembly is CTPmin, and the following condition is satisfied:

$0.90<CTPmin/CTPmax<10.0$.

8. The photographing optical lens assembly of claim 1, wherein the central thickness of the third lens element is CT3, a maximum central thickness among central thicknesses of all lens elements of the photographing optical lens assembly is CTmax, and the following condition is satisfied:

$0.85<CT3/CTmax \leq 1.0$.

9. The photographing optical lens assembly of claim 1, wherein the focal length of the first lens element is f1, the focal length of the second lens element is f2, the focal length of the third lens element is f3, a focal length of the fourth lens element is f4, and the following condition is satisfied:

$(|f1|+|f2|+|f4|)/|f3|<1.0$.

10. The photographing optical lens assembly of claim 1, wherein the focal length of the photographing optical lens assembly is f, an axial distance between an object-side surface of the first lens element and an image surface is TL, and the following conditions are satisfied:

$0<f/TL<0.20$; and 2.0 millimeters$<f<6.0$ millimeters.

11. The photographing optical lens assembly of claim 1, wherein the focal length of the first lens element is f1, the focal length of the second lens element is f2, the focal length of the third lens element is f3, a focal length of the fourth lens element is f4, a focal length of the fifth lens element is f5, a focal length of the sixth lens element is f6, a focal length of the i-th lens element is fi, and the following condition is satisfied:

$|f3|>|fi|$ wherein $i=1,2,4,5,6$.

12. The photographing optical lens assembly of claim 1, wherein the focal length of the photographing optical lens assembly is f, the focal length of the third lens element is f3, a focal length of the fourth lens element is f4, a focal length of the fifth lens element is f5, and the following conditions are satisfied:

$0<f4/f5<1.5$; and $-0.30<f/f3<0.30$.

13. The photographing optical lens assembly of claim 1, wherein a curvature radius of an image-side surface of the third lens element is R6, the central thickness of the third lens element is CT3, and the following condition is satisfied:

$0<R6/CT3<2.5$.

14. The photographing optical lens assembly of claim 1, wherein the central thickness of the third lens element is CT3, the central thickness of the sixth lens element is CT6, and the following condition is satisfied:

$0<CT6/CT3<0.35$.

15. The photographing optical lens assembly of claim 1, wherein a composite focal length of the first lens element and the second lens element is f12, the focal length of the photographing optical lens assembly is f, and the following condition is satisfied:

$-1.45<f12/f<-0.70$.

16. An image capturing unit, comprising:
    the photographing optical lens assembly of claim 1; and
    an image sensor, wherein the image sensor is disposed on an image surface of the photographing optical lens assembly.

17. An electronic device, comprising:
    the image capturing unit of claim 16.

18. The photographing optical lens assembly of claim 1, wherein the second lens element has an object-side surface being concave.

19. The photographing optical lens assembly of claim 1, wherein the sixth lens element has an image-side surface being concave.

20. A photographing optical lens assembly comprising, in order from an object side to an image side:
    a first lens element having negative refractive power;
    a second lens element having negative refractive power;
    a third lens element;
    a fourth lens element having positive refractive power;
    a fifth lens element having positive refractive power; and
    a sixth lens element having negative refractive power;
    wherein the photographing optical lens assembly has a total of six lens elements, and a central thickness of the second lens element is larger than a central thickness of the sixth lens element;
    wherein the photographing optical lens assembly further comprises an aperture stop, there are a front lens group comprising every lens element located between an imaged object and the aperture stop in the photographing optical lens assembly, and a rear lens group comprising every lens element located between the aperture stop and an image surface in the photographing optical lens assembly; a focal length of the first lens element is f1, a focal length of the second lens element is f2, a focal length of the third lens element is f3, a central thickness of the third lens element is CT3, a minimum central thickness among central thicknesses of all lens elements of the photographing optical lens assembly is CTmin, a focal length of the front lens group is ff, a focal length of the rear lens group is fr, and the following conditions are satisfied:

$|f1|<|f2|<|f3|$;

$4.0<CT3/CTmin<12.0$; and $ff/fr<0$.

21. The photographing optical lens assembly of claim 20, wherein the fourth lens element has an object-side surface being convex, and an axial distance between the first lens element and the second lens element is the maximum among all axial distances between every two lens elements of the photographing optical lens assembly that are adjacent to each other.

22. The photographing optical lens assembly of claim 20, wherein an Abbe number of the third lens element is V3, an Abbe number of the fifth lens element is V5, an Abbe number of the sixth lens element is V6, and the following condition is satisfied:

$0.30<(V3+V6)/V5<1.0$.

23. The photographing optical lens assembly of claim 20, wherein a curvature radius of an image-side surface of the third lens element is R6, the central thickness of the third lens element is CT3, and the following condition is satisfied:

$0<R6/CT3<2.5$.

24. The photographing optical lens assembly of claim 23, wherein the curvature radius of the image-side surface of the third lens element is R6, the central thickness of the third lens element is CT3, and the following condition is satisfied:

$0<R6/CT3<1.8$.

25. The photographing optical lens assembly of claim 20, wherein a focal length of the photographing optical lens assembly is f, the focal length of the third lens element is f3, and the following condition is satisfied:

$-0.15<f/f3<0.15$.

26. The photographing optical lens assembly of claim 20, wherein the third lens element has negative refractive power.

27. The photographing optical lens assembly of claim 20, wherein the focal length of the front lens group is ff, the focal length of the rear lens group is fr, and the following condition is satisfied:

$-1.0<ff/fr<-0.20$.

28. The photographing optical lens assembly of claim 20, wherein a curvature radius of an object-side surface of the third lens element is R5, a curvature radius of an image-side surface of the third lens element is R6, a curvature radius of an object-side surface of the fifth lens element is R9, a curvature radius of an image-side surface of the fifth lens element is R10, and the following conditions are satisfied:

$|R9|>|R10|$; and $|R5|>|R6|$.

29. The photographing optical lens assembly of claim 20, wherein a curvature radius of an object-side surface of the third lens element is R5, a curvature radius of an image-side surface of the third lens element is R6, and the following condition is satisfied:

$-0.20<(R5-R6)/(R5+R6)<0.35$.

30. The photographing optical lens assembly of claim 20, wherein the second lens element has an object-side surface being concave.

31. The photographing optical lens assembly of claim 20, wherein the sixth lens element has an image-side surface being concave.

32. The photographing optical lens assembly of claim 20, wherein the focal length of the first lens element is f1, the focal length of the second lens element is f2, the focal length of the third lens element is f3, a focal length of the fourth lens element is f4, and the following condition is satisfied:

$(|f1|+|f4|)/|f3|<0.46$.

33. The photographing optical lens assembly of claim 20, wherein a central thickness of the third lens element is CT3, the central thickness of the sixth lens element is CT6, and the following condition is satisfied:

$0<CT6/CT3<0.19$.

* * * * *